United States Patent
Kumar et al.

(10) Patent No.: US 8,838,302 B2
(45) Date of Patent: Sep. 16, 2014

(54) SYSTEM AND METHOD FOR ASYNCHRONOUSLY CONTROLLING A VEHICLE SYSTEM

(71) Applicant: General Electric Company, Schenectady, NY (US)

(72) Inventors: Ajith Kuttannair Kumar, Erie, PA (US); Brian Nedward Meyer, Fairview, PA (US); Ramu Sharat Chandra, Niskayuna, NY (US); James D. Brooks, Schenectady, NY (US); Dan Dai, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/729,298

(22) Filed: Dec. 28, 2012

(65) Prior Publication Data

US 2014/0188375 A1    Jul. 3, 2014

(51) Int. Cl.
| | | |
|---|---|---|
| *B61L 3/00* | (2006.01) |
| *G06F 17/10* | (2006.01) |
| *G06F 17/00* | (2006.01) |
| *B61L 3/16* | (2006.01) |
| *B61L 3/02* | (2006.01) |
| *B61C 17/12* | (2006.01) |

(52) U.S. Cl.
CPC ............... *G06F 17/00* (2013.01); *B61L 3/006* (2013.01); *B61L 3/16* (2013.01); *B61L 3/02* (2013.01); *B61L 15/38* (2013.01); *B60L 2200/26* (2013.01); *Y02T 30/10* (2013.01); *B61C 17/12* (2013.01)
USPC ................. 701/19; 246/186; 180/14.1; 703/2

(58) Field of Classification Search
CPC ............. B61L 3/006; B61L 3/02; B61L 3/16; B61L 2200/26; B61L 15/2045; B61L 15/38; B61C 7/04; B61C 17/12; Y02T 30/10

USPC ........... 701/1, 19, 117; 180/14.1, 14.4; 703/2; 246/167 R, 186
See application file for complete search history.

(56) References Cited

U.S. PATENT DOCUMENTS

| | | |
|---|---|---|
| 5,720,455 A | 2/1998 | Klemanski et al. |
| 5,738,311 A | 4/1998 | Fernandez |

(Continued)

FOREIGN PATENT DOCUMENTS

| | | |
|---|---|---|
| WO | WO9960735 A1 | 11/1999 |
| WO | WO2010039680 A1 | 4/2010 |
| ZA | 200101708 A | 8/2001 |

*Primary Examiner* — Russell Frejd
(74) *Attorney, Agent, or Firm* — GE Global Patent Operation; John A. Kramer

(57) ABSTRACT

A method includes identifying power outputs to be provided by propulsion-generating vehicles of a vehicle system for different locations along a route and calculating handling parameters of the vehicle system at the locations along the route. The handling parameters are representative of at least one of coupler forces, coupler energies, relative vehicle velocities, or natural forces exerted on the vehicle system. The method also includes determining asynchronous operational settings for the propulsion-generating vehicles at the locations. The asynchronous operational settings represent different operational settings that cause the propulsion-generating vehicles to provide at least the power outputs at the locations while changing the handling parameters of the vehicle system to designated values at the locations. The method further includes communicating the asynchronous operational settings to the propulsion-generating vehicles in order to cause the propulsion-generating vehicles to implement the asynchronous operational settings at the different locations.

22 Claims, 7 Drawing Sheets

(56) References Cited

U.S. PATENT DOCUMENTS

| | | |
|---|---|---|
| 5,740,547 A | 4/1998 | Kull et al. |
| 5,785,392 A | 7/1998 | Hart |
| 5,813,635 A | 9/1998 | Fernandez |
| 5,820,226 A | 10/1998 | Hart |
| 5,833,325 A | 11/1998 | Hart |
| 5,927,822 A | 7/1999 | Hart |
| 5,934,764 A | 8/1999 | Dimsa et al. |
| 5,969,643 A | 10/1999 | Curtis |
| 5,978,718 A | 11/1999 | Kull |
| 5,986,577 A | 11/1999 | Bezos |
| 5,986,579 A | 11/1999 | Halvorson |
| 5,995,881 A | 11/1999 | Kull |
| 6,114,974 A | 9/2000 | Halvorson |
| 6,128,558 A | 10/2000 | Kernwein |
| 6,163,089 A | 12/2000 | Kull |
| 6,216,095 B1 | 4/2001 | Glista |
| 6,275,165 B1 | 8/2001 | Bezos |
| 6,322,025 B1 | 11/2001 | Colbert et al. |
| 6,360,998 B1 | 3/2002 | Halvorson et al. |
| 6,377,215 B1 | 4/2002 | Halvorson et al. |
| 6,782,044 B1 | 8/2004 | Wright et al. |
| 7,309,929 B2 * | 12/2007 | Donnelly et al. ............ 290/4 R |
| 7,416,262 B2 | 8/2008 | Ring |
| 7,518,254 B2 * | 4/2009 | Donnelly et al. ........... 290/40 C |
| 7,667,347 B2 * | 2/2010 | Donnelly et al. ............ 307/10.1 |
| 7,906,862 B2 * | 3/2011 | Donnelly et al. ................ 290/6 |
| 7,944,081 B2 * | 5/2011 | Donnelly et al. ............ 307/9.1 |
| 8,157,218 B2 | 4/2012 | Riley et al. |
| 8,220,572 B2 * | 7/2012 | Donnelly ................ 180/65.265 |
| 8,428,798 B2 | 4/2013 | Kull |
| 2005/0121971 A1 | 6/2005 | Ring |
| 2009/0090818 A1 * | 4/2009 | Kumar .......................... 246/186 |
| 2012/0277940 A1 * | 11/2012 | Kumar et al. .................... 701/20 |
| 2012/0277941 A1 * | 11/2012 | Noffsinger et al. .............. 701/21 |

* cited by examiner

SYSTEM AND METHOD FOR ASYNCHRONOUSLY CONTROLLING A VEHICLE SYSTEM

TECHNICAL FIELD

Embodiments of the subject matter described herein relate to controlling operations of a vehicle system.

BACKGROUND

Some known vehicle systems include multiple vehicles connected together so that the vehicles can travel together. Such vehicle systems can be referred to as consists. Some rail vehicle systems can include multiple consists that each includes locomotives (or other powered rail vehicles) providing propulsive force.

The operations of the locomotives can be coordinated with each other by remotely controlling some locomotives from another locomotive in the rail vehicle. For example, distributed power (DP) control of the locomotives may involve all locomotives in the rail vehicle system (e.g., a train) being controlled to have the same throttle and/or brake settings at the same time. Alternatively, the locomotives in a first consist of the rail vehicle system may operate with the same throttle or brake settings while the locomotives in a different, second consist of the same rail vehicle system operate with throttle or brake settings that are the same, but different from the settings used by the locomotives in the first consist.

Because rail vehicle systems may be very long, different segments of the rail vehicle systems may experience different grades and/or curvatures in a track at the same time. Using the same throttle or brake settings for multiple locomotives traveling over different grades and/or curvatures can result in undesirable forces on couplers of the rail cars that are located between the locomotives and/or undesirable movements of the rail cars. For example, when cresting a hill, using the same throttle settings on all locomotives can cause the rail cars located at or near the apex of the hill to experience relatively large tensile forces, can cause the rail cars on the downward slope of the hill to move faster than and away from other rail cars at or near the apex, and/or can cause the rail cars on the upward slope of the hill to move slower than and away from the other rail cars at or near the apex. These forces and/or movements can damage the couplers, cause the rail vehicle system to break apart, and/or generally degrade handling of the rail vehicle system as experienced by an operator of the rail vehicle system.

BRIEF DESCRIPTION

In one embodiment, a method (e.g., for determining operational settings for a vehicle system having multiple vehicles connected with each other by couplers to travel along a route) includes identifying total power outputs to be provided by propulsion-generating vehicles of the vehicles in the vehicle system. The total power outputs are determined for different locations of the vehicle system along the route. The method also includes calculating handling parameters of the vehicle system at one or more of the different locations along the route. The handling parameters are representative of at least one of forces exerted on the couplers, energies stored in the couplers, relative velocities of neighboring vehicles of the vehicles in the vehicle system, or natural forces exerted on one or more segments of the vehicle system between two or more of the propulsion-generating vehicles. The method also includes determining asynchronous operational settings for the propulsion-generating vehicles at the different locations along the route. The asynchronous operational settings represent different operational settings for the propulsion-generating vehicles that cause the propulsion-generating vehicles to provide at least the total power outputs at the respective different locations while changing the handling parameters of the vehicle system to one or more designated values at the different locations along the route. As one example, the different operational settings may be different notch settings of throttles of the different vehicles in the vehicle system. Due to differences in the vehicles, different notch settings on different vehicles may result in the vehicles individually providing the same amount of power output. Alternatively, the vehicles may provide different power outputs when using the same throttle settings. The method further includes communicating the asynchronous operational settings to the propulsion-generating vehicles in order to cause the propulsion-generating vehicles to implement the asynchronous operational settings at the different locations.

In one embodiment, a system (e.g., a control system for a vehicle system) includes an effort determination unit configured to identify total power outputs to be provided by a vehicle system that includes multiple vehicles connected with each other by couplers to travel along a route. The effort determination unit also is configured to identify the total power outputs to be provided by propulsion-generating vehicles of the vehicles in the vehicle system at different locations of the vehicle system along the route. The system includes a handling unit configured to calculate handling parameters of the vehicle system at one or more of the different locations along the route. The handling parameters are representative of at least one of forces exerted on the couplers, energies stored in the couplers, relative velocities of neighboring vehicles of the vehicles in the vehicle system, or natural forces exerted on one or more segments of the vehicle system between two or more of the propulsion-generating vehicles. The system includes a processing unit configured to determine asynchronous operational settings for the propulsion-generating vehicles at the different locations along the route. The asynchronous operational settings represent different operational settings for the propulsion-generating vehicles that cause the propulsion-generating vehicles to provide at least the total power outputs at the respective different locations while changing the handling parameters of the vehicle system to one or more designated values at the different locations along the route. The asynchronous operational settings are configured to be communicated to the propulsion-generating vehicles in order to cause the propulsion-generating vehicles to implement the asynchronous operational settings at the different locations.

In one embodiment, a method (e.g., for determining operational settings for a vehicle system having two or more propulsion-generating vehicles coupled with each other by one or more non-propulsion generating vehicles) includes obtaining route data and vehicle data. The route data is representative of one or more grades of a route at one or more locations along the route that is to be traveled by the vehicle system. The vehicle data is representative of a size of the one or more non-propulsion generating vehicles disposed between the propulsion-generating vehicles. The method also includes calculating one or more estimated natural forces that are to be exerted on couplers connected with the one or more non-propulsion generating vehicles of the vehicle system at the one or more locations along the route. The one or more estimated natural forces are based on the size of the one or more non-propulsion generating vehicles and the one or more grades of the route at the one or more locations along the route. The method also includes determining asynchronous operational settings to be implemented by the two or more propulsion-generating vehicles at the one or more locations along the route. Implementing the asynchronous operational settings by the two or more propulsion-generating vehicles reduces one or more actual natural forces that are actually exerted on the couplers to forces that are smaller than the one or more estimated natural forces when the vehicle system travels over the one or more locations along the route.

BRIEF DESCRIPTION OF THE DRAWINGS

The subject matter described herein will be better understood from reading the following description of non-limiting embodiments, with reference to the attached drawings, wherein below.

DETAILED DESCRIPTION

Figure 1:
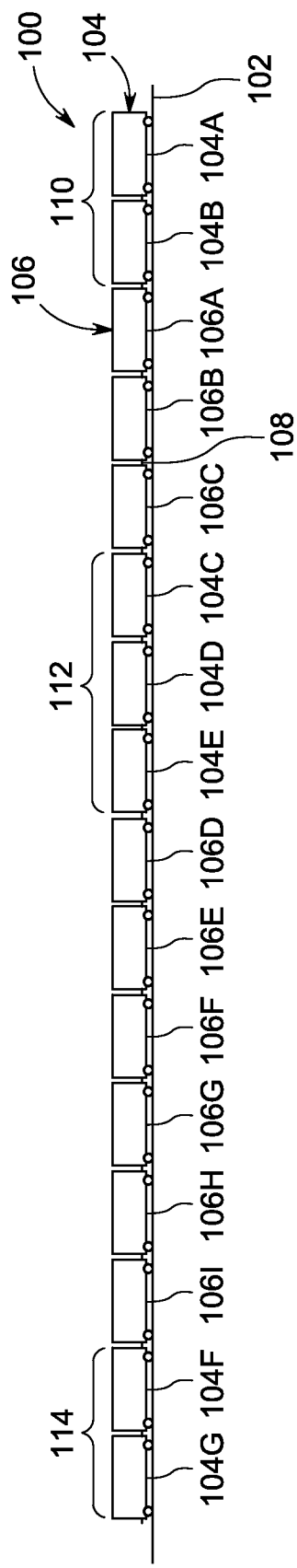
FIG. 1 illustrates a schematic diagram of one example of a vehicle system traveling along a route.

FIG. 1 illustrates a schematic diagram of one example of a vehicle system 100 traveling along a route 102. The vehicle system 100 includes several vehicles 104, 106 connected with each other, such as by couplers 108. Two vehicles 104 and/or 106 may be directly connected with each other when no other vehicle 104 or 106 is disposed between the directly connected vehicles 104 and/or 106. Two vehicles 104 and/or 106 may be indirectly connected or interconnected with each other when one or more other vehicles 104 and/or 106 are disposed between and connected with the interconnected vehicles 104 and/or 106.

The vehicles 104 (e.g., vehicles 104A-G) represent propulsion-generating vehicles, such as vehicles capable of generating propulsive force to propel the vehicle system 100 along the route 102. Examples of propulsion-generating vehicles 106 include locomotives, other off-highway vehicles (e.g., vehicles that are not designed for or permitted to travel on public roadways), automobiles (e.g., vehicles that are designed for traveling on public roadways), marine vessels, and the like. In one embodiment, the vehicles 104 represent locomotives and the vehicles 106 represent rail cars. The vehicles 104 may be fuel-powered vehicles (e.g., engines that consume fuel are used to generate propulsive force by creating electric current to power motors or to rotate axles and wheels), electric-powered vehicles (e.g., onboard or offboard sources of electric current are used to power motors to generate propulsive force), and/or hybrid powered vehicles (e.g., vehicles that are powered by fuel-consuming engines and other sources of electric current). The vehicles 106 (e.g., vehicles 106A-I) represent non-propulsion-generating vehicles, such as rail cars or other units that are propelled along the route 102 by the propulsion-generating vehicles 104.

The propulsion-generating vehicles 104 may be arranged in groups, such as consists 110, 112, 114 shown in FIG. 1. Each consist 110, 112, 114 may include the propulsion-generating vehicles 104 directly connected with each other in the vehicle system 100. While each consist 110, 112, 114 is shown as including multiple propulsion-generating vehicles 104, one or more of the consists 110, 112, 114 may optionally include a single propulsion-generating vehicle 104.

While the vehicle system 100 is shown in FIG. 1 as a train, alternatively, the vehicle system 100 may represent another vehicle system formed of vehicles other than locomotives (e.g., the propulsion-generating vehicles 104) and railcars (e.g., the non-propulsion generating vehicles 106). For example, the vehicle system 100 may represent several automobiles, marine vessels, off-highway vehicles other than rail vehicles, or the like, joined together to travel along the route 102.

In one embodiment, tractive efforts (e.g., power output, horsepower, speed, and the like) and/or braking efforts of the vehicle system 100 may be controlled to drive the vehicle system 100 along the route 102 from an origin location to a destination location. The tractive and/or braking efforts may be automatically controlled such that the tractive and/or braking efforts provided by the vehicles 104, 106 without operator intervention involved in changing these efforts. Alternatively or additionally, the vehicle system 100 may provide prompts and notices to an operator that direct the operator how to manually control the efforts of the vehicle system 100. For example, the system 100 may provide prompts to an operator to instruct the operator of which operational settings to use at a current time and/or which settings to use at upcoming times when the system 100 arrives at one or more upcoming locations.

The tractive efforts and braking efforts may be controlled by designating operational settings of the vehicle system 100 at one or more locations along the route 102. By way of example, these operational settings can include power settings (e.g., throttle notch settings) that control the power output from the propulsion-generating vehicles 104 and brake settings (e.g., dynamic brake settings) that control the braking efforts of the propulsion-generating vehicles 104 and/or the non-propulsion generating vehicles 106. The operational settings that are designated for a trip of the vehicle system 100 from a first location to a different, second location along the route 102 may be referred to as a trip plan. The designated operational settings can be expressed as a function of time elapsed during a trip along the route 102 and/or distance along the route 102 in the trip plan.

The designated operational settings can be computed in order to improve handling (e.g., control) of the vehicle system 100. For example, the designated operational settings can be determined in order to reduce the frequency at which throttle notch settings and/or brake settings are changed, to reduce abrupt jerking movements of the vehicle system 100 or segments of the vehicle system 100, to reduce forces exerted on the couplers 108, and the like.

In one embodiment, different propulsion-generating vehicles 104 may have different operational settings at the same location and/or time along the route 102. For example, the propulsion-generating vehicles 104 may be asynchronously controlled so that not all of the vehicles 104 in the vehicle system 100 and/or in a single consist 110, 112, 114 are controlled according to the same throttle and/or brake settings. Alternatively, the propulsion-generating vehicles 104 may be divided into groups (e.g., the consists 110, 112, 114 or other groupings) with virtual "fences" between the groups. A fence demarcates a pair of groups of the propulsion-generating vehicles 104 on opposite sides of the fence. For example, if a fence is established between the consists 112 and 114, then the propulsion-generating vehicles 104C-E in the consist 112 may operate using a first designated throttle notch setting while the propulsion-generating vehicles 104F-G in the consist 114 may operate using a different, second designated throttle notch setting at the same time. Operation of the vehicle system 100 that involves two or more of the propulsion-generating vehicles 104 using different operational settings at the same time may be referred to as asynchronous distributed power operation in one embodiment.

Figure 2:
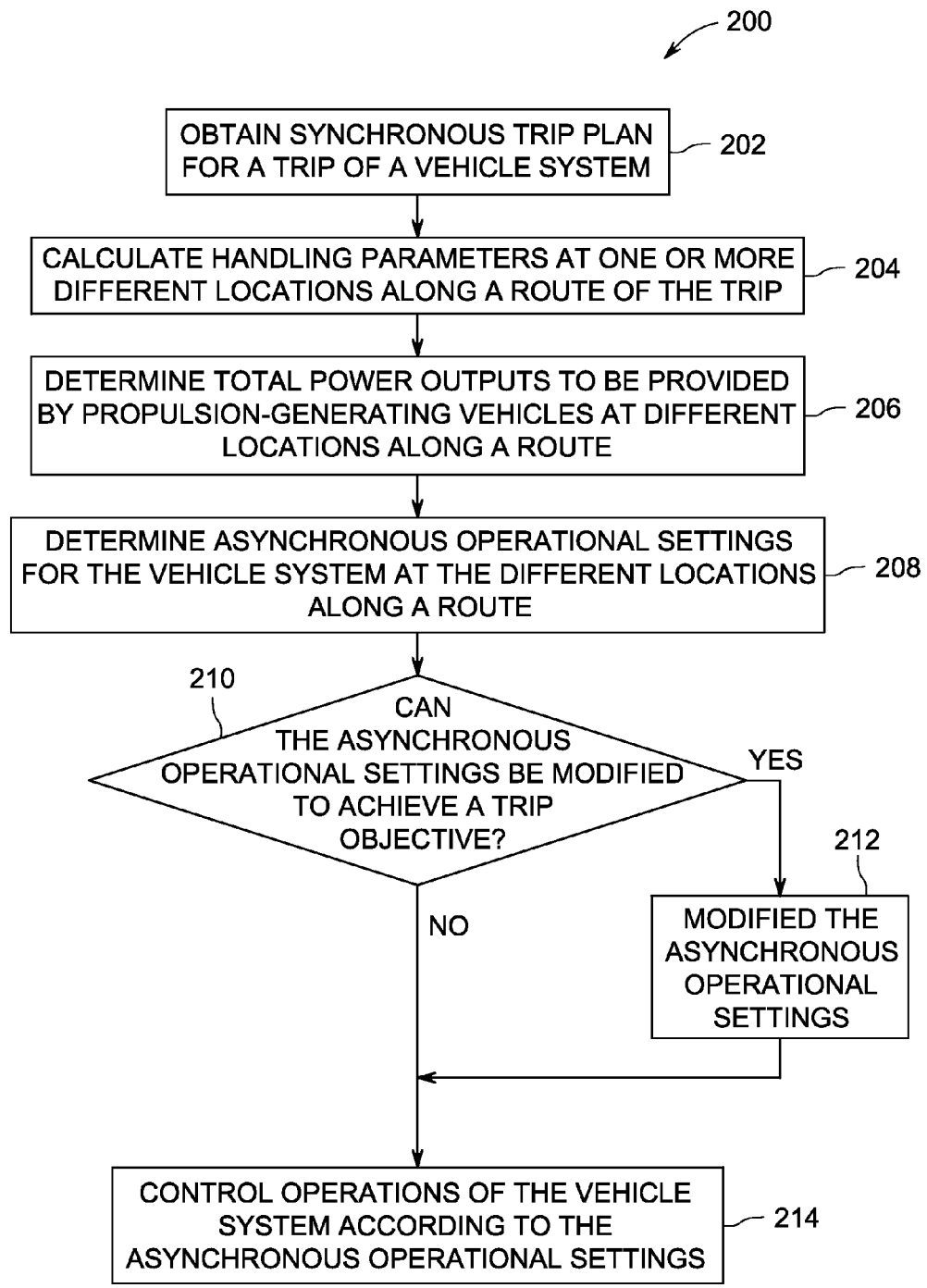
FIG. 2 is a flowchart of one embodiment of a method for operating the vehicle system shown in FIG. 1.
Figure 3:
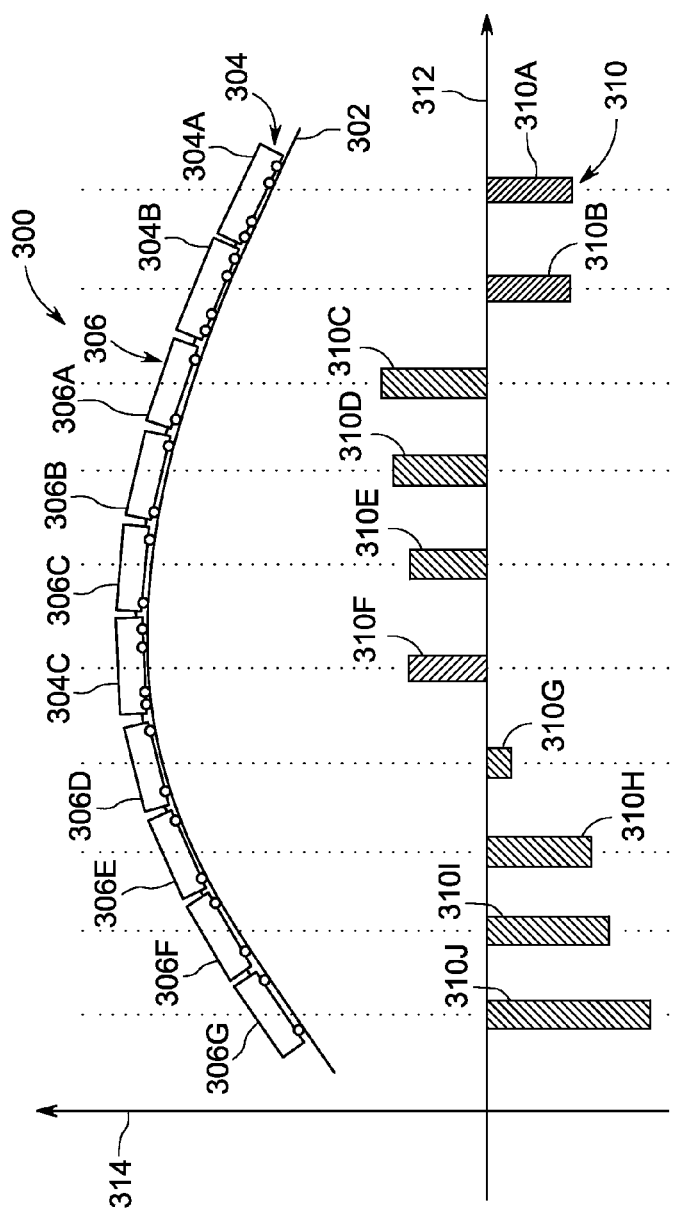
FIG. 3 illustrates coupler parameters that are estimated for a vehicle system to travel along a route in accordance with one example.
Figure 4:
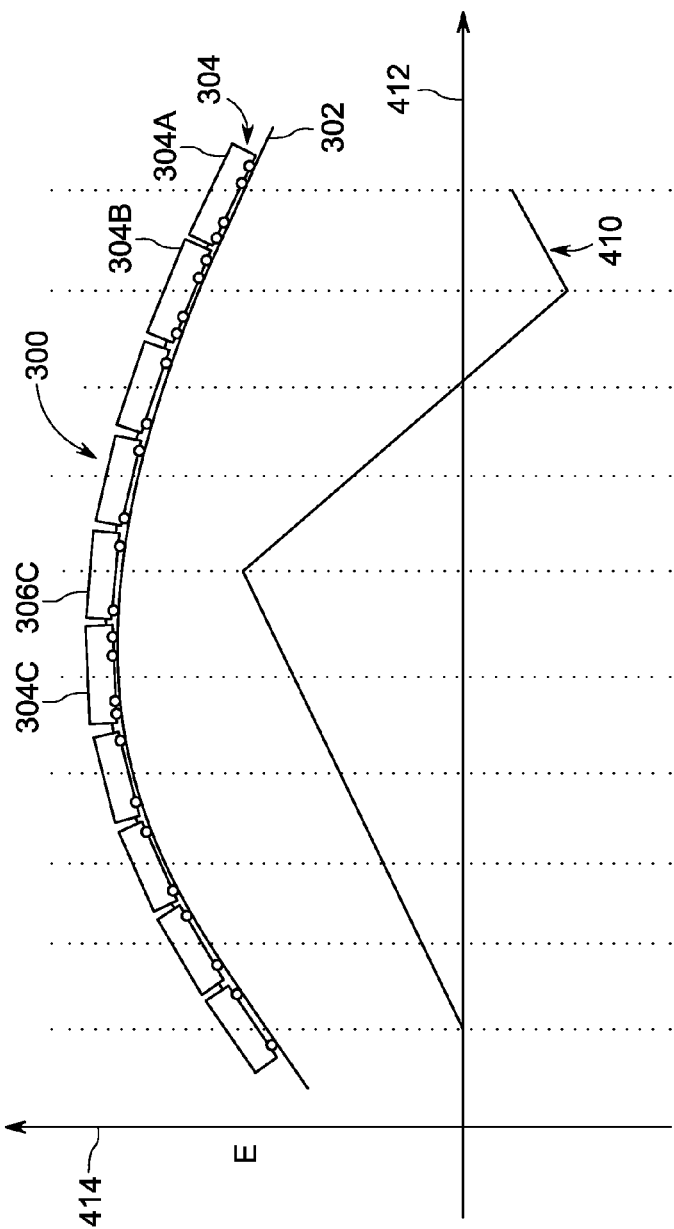
FIG. 4 illustrates terrain excitation parameters that are estimated for the vehicle system shown in FIG. 3 to travel along the route also shown in FIG. 3 in accordance with one example.

FIGS. 2 through 4 illustrate embodiments of how operations of the propulsion-generating vehicles 104 in the vehicle system 100 can be controlled in order to improve handling of the vehicle system 100 during a trip while achieving one or more trip objectives and while remaining within operating constraints on the trip. The trip objectives may be a reduction in fuel consumption, emission generation, and/or travel time relative to traveling with the same vehicle system 100 along the same route 102, but using different operational settings at one or more locations along the route 102. The operating constraints may include speed limits (both lower limits on speed and upper limits on speed), power requirements (e.g., minimum requirements for power to propel the vehicle system 100 up an incline), time limitations on how long an operator may be working on the vehicle system 100, a system-wide schedule for the travel of multiple vehicle systems on or across the route 102, or the like.

FIG. 2 is a flowchart of one embodiment of a method 200 for operating the vehicle system 100 shown in FIG. 1. The method 200 may be used in conjunction with the vehicle system 100. For example, the method 200 may be used to create a trip plan for the vehicle system 100 that designates operational settings to be used to asynchronously control the operations of the propulsion-generating vehicles 104 (shown in FIG. 1) during a trip along the route 102 (shown in FIG. 1) in order to improve handling of the vehicle system 100. Additionally or alternatively, the method 200 may be used to autonomously control the operations of the propulsion-generating vehicles 104 in an asynchronous manner during a trip along the route 102 in order to improve handling of the vehicle system 100. Additionally or alternatively, the method 200 may be used to direct an operator to manually control the operations of the propulsion-generating vehicles 104 in an asynchronous manner during a trip along the route 102 in order to improve handling of the vehicle system 100.

At 202, a synchronous trip plan for the trip is obtained. The trip plan may be synchronous in that the operational settings of the propulsion-generating vehicles 104 that are designated by the trip plan may be the same for the propulsion-generating vehicles 104 at the same locations. The trip plan may designate the operational settings of the vehicle system 100 in order to reduce fuel consumed, emissions generated, and the like, by the vehicle system 100 relative to the vehicle system 100 traveling along the route 102 in the trip using one or more different operational settings (e.g., according to manual control and/or another, different trip plan). One or more examples of trip plans (also referred to as mission plans or trip profiles) and how the trip plans are determined are provided in U.S. patent application Ser. No. 11/385,354 (referred to herein as the "'354 Application"), the entire disclosure of which is incorporated by reference.

In one embodiment, the synchronous trip plan can be created at 202 by collecting and using trip data, route data, and vehicle data. The trip data includes information representative of one or more constraints of the trip, such as a starting location, an ending location, one or more intermediate locations between the starting and ending locations, a scheduled time of arrival at one or more locations, weather conditions (e.g., direction and speed of wind) and the like. The route data includes information representative of the route 102, including grades, curvatures, speed limits, and the like. The vehicle data includes information representative of capabilities and/or limitations of the vehicle system 100, such as power outputs that can be provided by the vehicle system 100, tractive efforts provided by the propulsion-generating vehicles 104 at different throttle notch settings, braking efforts provided by the vehicles 104, 106 at different brake notch settings, and the like. The vehicle data also can include the size (e.g., mass, length, number of axles, weight distribution, or the like) of the vehicles 104 and/or 106 in the vehicle system 100. The trip plan can be computed from the beginning to the end of the trip and can designate speeds of the vehicle system 100, synchronous notch settings of the propulsion-generating vehicles 104, and synchronous brake settings of the propulsion-generating vehicles 104, 106 at locations along the route 102.

At 204, handling parameters are calculated at one or more different locations along the route 102. The handling parameters may be calculated prior to the vehicle system 100 embarking on the trip and/or during travel of the vehicle system 100 in the trip and prior to arriving at the one or more different locations. The handling parameters are estimates or measurements of one or more aspects of the vehicle system 100 and/or the route 102. Several examples of handling parameters are described below.

One example of handling parameters is coupler parameters. Coupler parameters include one or combinations of estimates, calculations, measurements, and/or simulations of coupler forces and/or energies stored in the couplers 108 (shown in FIG. 1) of the vehicle system 100 at one or more locations along the route 102 for the trip. In one embodiment, the coupler forces and/or energies stored in the couplers 108 can be estimated from a model of the couplers 108. For example, the couplers 108 between the vehicles 104, 106 can be modeled as springs having spring constants k and a damper (e.g., the mass of the vehicles 104 and/or 106 to which the modeled spring is coupled). Due to the tractive efforts (e.g., power outputs) provided by the propulsion-generating vehicles 104, the states of the vehicle system 100 may undergo a transition and the forces exerted on the couplers 108 and/or the energies stored in the couplers 108 that result from this transition at different locations along the route 102 can be calculated (e.g., estimated or simulated) as a function of the tractive efforts provided by the propulsion-generating vehicles 104 at the different locations. By way of example only, a first coupler 108 may be expected to become compressed due to the expected deceleration of a first leading propulsion-generating vehicle 104 and the expected acceleration of a first trailing propulsion-generating vehicle 104 that are caused by changes in the grade of the route 102 during travel according to the synchronous trip plan (e.g., when traversing a valley or low point in the route 102). Another, second coupler 108 may be expected to become stretched due to the expected acceleration of a second leading propulsion-generating vehicle 104 and the expected deceleration of a second trailing propulsion-generating vehicle 104 that are caused by changes in the grade of the route 102 during travel according to the synchronous trip plan (e.g., when traversing a peak or high point in the route 102). The first coupler 108 may be estimated to have a greater compressive force than the second coupler 108 in this example.

One or more relationships between the coupler forces and/or energies stored in the couplers 108 can be used to determine the coupler parameters. One example of a coupler parameter includes:

$$P_c = \sum_{j=1}^{nc} f_j^2 \qquad \text{(Equation \#1)}$$

where $P_c$ represents a coupler parameter, nc represents a number of the couplers 108 in the vehicle system 100 (e.g., the total number of couplers 108), and $f$ represents the estimated or modeled coupler force. The coupler parameter ($P_c$) of Equation #1 may represent the sum of squares of all coupler forces between the first coupler 108 (e.g., when j=1) and the $n^{th}$ coupler 108 in the vehicle system 100.

Another example of a coupler parameter includes the maximum coupler force of the couplers 108 at a location along the route 102.

Another example of a coupler parameter includes:

$$E = \sum_{j=1}^{nc} 0.5 \frac{f_j^2}{k_j} \qquad \text{(Equation \#2)}$$

where E represents another coupler parameter and k represents the spring constant of a modeled spring representative of the $j^{th}$ coupler 108. The coupler parameter (E) of Equation #2 may represent the total energy stored in the couplers 108 of j=1 through j=nc in the vehicle system 100 at a location along the route 102. Additionally or alternatively, the coupler parameter may include or represent an average of an absolute value of the coupler forces in the vehicle system 100. Additionally or alternatively, the coupler parameter may include or represent a sum, maximum, average, median, and the like of the absolute values of the coupler forces in the vehicle system 100 that are at least as large as a designated upper limit. The upper limit may be based on the location of the vehicle system 100 (e.g., the limit is based on the terrain being traveled over), vehicle data (e.g., the type of vehicles in the system 100), coupler data (e.g., the type, health, age, and the like, of the couplers in the system 100), and the like.

One or more of the coupler parameters described above and/or another coupler parameter that represents coupler force and/or energy stored in the couplers 108 may be determined for the vehicle system 100 at one or more locations along the route 102 during the trip. For example, prior to arriving at the locations, the coupler parameters may be calculated or estimated for those locations using the trip data, the vehicle data, and/or the route data.

FIG. 3 illustrates coupler parameters 310 (e.g., coupler parameters 310A-J) that are estimated for a vehicle system 300 to travel along a route 302 in accordance with one example. The vehicle system 300 may represent the vehicle system 100 (shown in FIG. 1) or a segment of the vehicle system 100. The vehicle system 300 includes propulsion-generating vehicles 304 (e.g., vehicles 304A-C), which can represent the propulsion-generating vehicles 104 (shown in FIG. 1) and non-propulsion generating vehicles 306 (e.g., vehicles 306A-G), which can represent the non-propulsion generating vehicles 106 (shown in FIG. 1). The vehicles 304, 306 are connected by couplers 108 (shown in FIG. 1). The route 302 may represent a portion of the route 102 (shown in FIG. 1).

The coupler parameters 310 are shown alongside a horizontal axis 312 that is representative of locations along the length of the vehicle system 300 and a vertical axis 314 that is representative of magnitudes of the coupler parameters 310. The size of the coupler parameters 310 indicates the relative sizes of the coupler forces and/or stored energies represented by the parameters 310. The coupler parameters 310 represent the coupler forces and/or energies of the couplers 108 joined to the respective vehicle 304, 306. For example, the coupler parameter 310A represents the coupler forces and/or stored energies of the coupler 108 connected to the vehicle 304A (or twice the coupler force and/or stored energy of the single coupler 108 connected to the vehicle 304A), the coupler parameter 310B represents the coupler forces and/or stored energies of the couplers 108 connected to the opposite ends of the vehicle 304B, the coupler parameter 310C represents the coupler forces and/or stored energies of the couplers 108 connected to the opposite ends of the vehicle 306A, and so on. Negative coupler parameters 310 (e.g., the parameters 310A-B and 310G-J extending below the horizontal axis 312) can represent couplers 108 undergoing compressive forces and positive coupler parameters 310 (e.g., the parameters 310C-F extending above the horizontal axis 312) can represent couplers 108 undergoing tensile forces.

The coupler parameters 310 can be estimated for travel over the route 302 prior to the vehicle system 300 actually traveling over the route 302 and using the synchronous trip plan established for travel over the route 302. The coupler parameters 310 may be calculated using one or more of the relationships described above, or in another manner that represents compression and/or tension in the couplers 108. In one embodiment, relatively large variances in the coupler parameters 310 can indicate poor handling of the vehicle system 300. For example, a trip plan that causes a vehicle system 300 to have relatively large, positive coupler parameters 310 and large, negative coupler parameters 310 may indicate that traveling according to the trip plan will result in poor handling of the vehicle system 300 relative to a trip plan that results in smaller positive coupler parameters 310 and/or smaller negative coupler parameters 310.

Returning to the discussion of the method 200 shown in FIG. 2, another example of handling parameters is terrain excitation parameters. Terrain excitation parameters represent grades of the route 102 (shown in FIG. 1) at the different locations, masses of one or more of the vehicles 104, 106 (shown in FIG. 1) in the vehicle system 100 (shown in FIG. 1) at the different locations, and/or tractive efforts that are to be provided by one or more of the propulsion-generating vehicles 104 at the different locations according to a trip plan (e.g., a synchronous trip plan).

A terrain index can represent the terrain under each vehicle 104, 106 as the vehicle system 100 travels along the route 102. The terrain index may have a static component (e.g., a DC or average or steady component) and a dynamic component (e.g., an AC or varying or oscillating component). The static component of the terrain index can be defined as:

$$\mu_i = m_i g_i + T_i \qquad \text{(Equation \#3)}$$

where $u_i$ represents the static component of the terrain index beneath the $i^{th}$ vehicle 104, 106 in the vehicle system 100, $m_i$ represents the mass of the $i^{th}$ vehicle 104, 106, $g_i$ represents the grade of the route 102 beneath the $i^{th}$ vehicle 104, 106, and $T_i$ represents a designated tractive effort and/or braking effort to be provided by the $i^{th}$ vehicle 104, 106 according to the trip plan (e.g., the synchronous trip plan).

The dynamic component of the terrain index can be defined as:

$$\tilde{\mu}_i = -m_i g_i + T_i - \sum_{j=1}^{N} \mu_i \quad \text{(Equation \#4)}$$

where $\tilde{\mu}_i$ represents the dynamic component of the terrain index and N represents the number of vehicles 104, 106 for which the terrain index is determined. In one embodiment, the coupler parameters 310 shown in FIG. 3 can represent the dynamic component of the terrain index for the vehicle system 300 instead of the coupler parameters of the vehicle system 300.

In one embodiment, the terrain excitation parameter may be based on the dynamic component of the terrain index. For example, the terrain excitation parameter may be a filtered dynamic component of the terrain index and represented by:

$$e(k) = \sum_{i=1}^{k} \tilde{\mu}_i a^{k-1} \quad \text{(Equation \#5)}$$

$$e(i) = \tilde{\mu}_i a^{k-1} \quad \text{(Equation \#6)}$$

where e(k) represents the terrain excitation parameter for the vehicle system 100 beneath the $k^{th}$ vehicle 104, 106, a represents a configurable or tunable constant referred to as a spatial decay rate of terrain input and having a value between 0 and 1, e(i) represents the terrain excitation parameter for the $i^{th}$ vehicle 104, 106 in the vehicle system 100, and m represents the number of vehicles 104, 106 in the vehicle system 100.

FIG. 4 illustrates terrain excitation parameters 410 that are estimated for the vehicle system 300 to travel along the route 302 in accordance with one example. The terrain excitation parameters 410 are shown alongside a horizontal axis 412 representative of locations along the length of the vehicle system 300 and a vertical axis 414 representative of magnitudes of the terrain excitation parameters 310.

As shown in FIG. 4, when the trip plan directs the propulsion-generating vehicles 304A-C to use the same braking efforts during traversal of the peak or apex in the route 302, the terrain excitation parameters 410 increase along the length of the vehicle system 300 and then decrease. For example, the terrain excitation parameters 410 corresponding to locations below the back end of the vehicle system 300 to beneath the non-propulsion generating vehicle 306C increase to a maximum, and then decrease to a minimum beneath the propulsion-generating vehicle 306B, before increasing again beneath the propulsion-generating vehicle 306A.

The terrain excitation parameters 410 can be estimated for travel over the route 302 prior to the vehicle system 300 actually traveling over the route 302 and using the synchronous trip plan established for travel over the route 302. The terrain excitation parameters 410 may be calculated using one or more of the relationships described above, or in another manner that represents compression and/or tension in the couplers 108. In one embodiment, relatively large terrain excitation parameters 410 (e.g., large positive and/or large negative values) can indicate poor handling of the vehicle system 300. For example, a trip plan that causes a vehicle system 300 to have relatively large maximum or minimum terrain excitation parameters 410 may indicate that traveling according to the trip plan will result in poor handling of the vehicle system 300 relative to a trip plan that results in smaller maximum or minimum terrain excitation parameters 410.

Returning to the discussion of the method 200 shown in FIG. 2, another example of handling parameters is node parameters. Node parameters represent a number of the nodes in the vehicle system 100 (shown in FIG. 1) and/or a rate of movement of the nodes in the vehicle system 100. A node can represent a location in the vehicle system 100 where an absolute value of force that is estimated to be exerted on a coupler 108 is less than a designated threshold. In order to identify the presence and locations of nodes, a rigid rope model of the vehicle system 100 may be used. In such a model, the couplers 108 are treated as having no slack and the vehicle system 100 is treated as traveling according to the trip plan (e.g., the synchronous trip plan). Locations where the couplers 108 are estimated to have relatively large compressive forces or relatively large tensile forces due to the tractive and/or braking efforts designated by the trip plan and due to the grades in the route 102 (shown in FIG. 1) are not identified as nodes. Other locations where the couplers 108 are estimated to have relatively small or no compressive or tensile forces are identified as nodes.

With respect to the example shown in FIG. 3, the coupler parameter 310G may represent the location of a node in the vehicle system 300. The number of nodes (e.g., one in the example of FIG. 3, but alternatively may be a larger number) can be a node parameter. Additionally or alternatively, the rate of movement of the nodes in the vehicle system can be a node parameter. For example, as the vehicle system moves up and down different grades of the route and/or using tractive and/or braking efforts designated by the synchronous trip plan, the locations of the nodes within the vehicle system may change (e.g., move to another coupler 108). This movement can be estimated as a speed or rate of movement, such as in units of number of couplers per second, number of vehicles per second, and the like.

Returning to the discussion of the method 200 shown in FIG. 2, another example of handling parameters is neighboring velocity parameters. The neighboring velocity parameters can represent differences in speed between neighboring vehicles 104 and/or 106 in the vehicle system 100 shown in FIG. 1. For example, speeds of the vehicles 104, 106 traveling according to a synchronous trip plan can be estimated based on the sizes (e.g., masses) of the vehicles 104, 106, the location of the vehicles 104, 106 in the vehicle system 100, the grade of the route 102, and the like. Because the couplers 108 between the vehicles 104, 106 are not entirely rigid bodies, there may be some differences in the speeds of the vehicles 104, 106 that are directly connected with each other.

For example, a leading propulsion-generating vehicle 104 that is accelerating according to a trip plan may at least temporarily travel faster than another, heavier propulsion-generating vehicle 104 that is directly coupled to the leading propulsion-generating vehicle 104 and/or than a non-propulsion generating vehicle 106 that is directly coupled to the leading propulsion-generating vehicle 104. As another example, when cresting a hill, a first vehicle 104 or 106 that is on the downward sloping side of the hill may be temporarily traveling faster than a second vehicle 104 or 106 that is directly connected to the first vehicle 104 or 106 and that is on the upward sloping side of the hill. In another example, when traversing a dip or low point in the route 102, a first vehicle 104 or 106 that is on the upward sloping side of the low point may be temporarily traveling slower than a second vehicle 104 or 106 that is directly connected to the first vehicle 104 or 106 and that is on the downward sloping side of the low point. The differences in speeds between the neighboring (e.g., adjacent) vehicles 104 and/or 106 can vary forces exerted on the couplers 108 to generate jerking movements that decrease the handling of the vehicle system 100.

At 206, total power outputs that are to be provided by the vehicle system 100 are determined at the locations along the route 102. For example, the total power outputs that are to be provided, in the aggregate, by the propulsion-generating vehicles 104 in the vehicle system 100 may be determined for at least some, or all, the same locations at which the handling parameters are determined at 204.

In one embodiment, the total power outputs can be determined from the synchronous trip plan. For example, the synchronous trip plan may designate the total power outputs to be provided by the propulsion-generating vehicles 104 at the locations. Alternatively, the synchronous trip plan can designate the individual power outputs to be provided by each of the propulsion-generating vehicles 104 at the locations, and the total power outputs of the vehicle system 100 can be determined from the sum or other aggregate of these individual power outputs. In another embodiment, the total power outputs can be derived from other designated operational settings of the synchronous trip plan at the locations. For example, the total power outputs may be calculated from the designated speeds, accelerations, or other settings of the synchronous trip plan at the locations. The total power outputs may be determined before, during, or after the handling parameters are determined.

At 208, asynchronous operational settings for the vehicle system 100 are determined. For example, the total power outputs can be distributed among the propulsion-generating vehicles 104 in the vehicle system 100 at the locations and based on the handling parameters by determining different operational settings for different vehicles 104, 106 at these locations. The total power outputs of the synchronous trip plan may be distributed among the propulsion-generating vehicles 104 by designating the same throttle and/or brake settings for each of the propulsion-generating vehicles 104. Using the handling parameters that are determined at the locations along the route 102, the same total power outputs at these locations can be distributed among the propulsion-generating vehicles 104 by designating different throttle and/or brake settings for the propulsion-generating vehicles 104. For example, the synchronous trip plan may direct the seven propulsion-generating vehicles 104 to use the same throttle setting to generate a total power output of 15,000 horsepower at a location along the route 102. This 15,000 horsepower may be asynchronously distributed among the propulsion-generating vehicles 104 by assigning different throttle and/or brake settings to the different propulsion-generating vehicles 104. The propulsion-generating vehicles 104 may use the different operational settings in order to provide at least the 15,000 horsepower, but with improved handling of the vehicle system 100 relative to the synchronous trip plan.

In one embodiment, the asynchronous operational settings are determined based on the handling parameters for all of the locations along the route 102 for which the handling parameters were estimated. Alternatively, the asynchronous operational settings may be determined for a subset of these locations, such as for the locations associated with handling parameters that exceed one or more designated thresholds. The handling parameters that exceed the thresholds may indicate locations or segments of the route 102 where handling of the vehicle system 100 may be more difficult than other locations or segments of the route 102.

The different operational settings of the propulsion-generating vehicles 104 may be designated for use by the vehicles 104 prior to embarking on the trip. For example, before the vehicle system 100 begins the trip (e.g., leaves a location of trip origin), the method 200 may be used to convert the same operational settings designated by the synchronous trip plan into the different (e.g., asynchronous) operational settings at one or more locations along the route 102. Then, when the vehicle system 100 arrives at or approaches the locations, the asynchronous operational settings may be used to control the propulsion-generating vehicles 104 (e.g., autonomously or by directing an operator to manually implement the asynchronous operational settings). Alternatively, the method 200 may be used to convert the operational settings of the synchronous trip plan into the asynchronous operational settings in real time. By "real time," it is meant that, in one embodiment, the operational settings of the synchronous trip plan that are associated with one or more locations along the route 102 (e.g., for implementation by the propulsion-generating vehicles 104 at those locations) can be converted into the asynchronous operational settings after the vehicle system 100 has begun traveling on the route 102 for the trip, but before or just as the vehicle system 100 arrives at the one or more locations. The vehicle system 100 may convert the operational settings on an as-needed basis, such as by converting the operational settings of the synchronous trip plan for a closer first location, and then converting the operational settings of the synchronous trip plan for a farther second location after passing the first location.

With respect to using the handling parameters to convert the operational settings of the synchronous trip plan into asynchronous operational settings, the method 200 may include (e.g., at 208) determining different operational settings for at least two or more of the propulsion-generating vehicles 104 at a location along the route 102 in order to change one or more of the handling parameters, such as to one or more designated values or limits. For example, the method 200 may include attempting to reduce or minimize one or more of the handling parameters by changing the operational settings from the synchronous trip plan. By "minimize," it is meant that the value of one or more of the handling parameters is reduced relative to the handling parameters as determined (e.g., estimated or simulated) from the synchronous trip plan, but not necessarily reduced to the absolute lowest value possible. "Minimizing" also can mean reducing the value to at least a designated limit, but not necessarily the smallest possible value. By way of example only, minimizing the handling parameters can include reducing one or more coupler parameters, terrain excitation parameters, node parameters, and/or neighboring velocity parameters relative to the corresponding coupler parameters, terrain excitation parameters, node parameters, and/or neighboring velocity parameters that are estimated using the synchronous trip plan, but not necessarily to a value of zero.

The designated limits to which the handling parameters are changed may be based on vehicle data and/or route data. For example, the limits may be expressed as a function of the terrain over which the vehicle system travels. As a result, the limits can be different at different locations along the route. As another example, the limits may be expressed as a function of the vehicle size (e.g., weight, weight distribution, length, and the like), the type of vehicle (e.g., the power output capability of the system or vehicle 104), the type of coupler (e.g., the strength, age, and/or health of the couplers), and the like.

The handling parameters that are estimated or simulated using the synchronous operational settings may be referred to as synchronous handling parameters and the handling parameters that are estimated or simulated using asynchronous operational settings may be referred to as asynchronous handling parameters. The handling parameters can be reduced by estimating or simulating the synchronous handling parameters, changing the synchronous operational settings to asynchronous operational settings (while keeping the total power output of the vehicle system 100 at least as large as the total power output that would be obtained using the synchronous operational settings), estimating or simulating the asynchronous handling parameters, and comparing the synchronous handling parameters with the asynchronous handling parameters. Several iterations of this process may be performed so that several potential asynchronous handling parameters and associated asynchronous operational settings are determined. Then, the asynchronous operational settings associated with one or more asynchronous handling parameters that are reduced relative to the synchronous handling parameters may be selected for use at the associated location along the route 102. Additionally or alternatively, a history of handling parameters using synchronous and/or asynchronous operational settings and handling parameters (e.g., as measured and/or estimated) from previous trips of the vehicle system 100 along the route 102 may be used to determine the asynchronous operational settings associated with reduced handling parameters.

In one embodiment, the asynchronous operational settings are directly determined without using a synchronous trip plan (e.g., without using the synchronous operational settings or by basing the asynchronous operational settings on previously generated synchronous operational settings). For example, instead of first obtaining or determining a synchronous trip plan and then determining the asynchronous operational settings from the synchronous trip plan, the asynchronous operational settings may be determined directly from data such as vehicle data and/or route data. In one example, the asynchronous operational settings may be determined by determining one or more solutions to an optimization problem represented by (and referred to as Equation #7):

$$\min_{u_1(x),\ldots,u_n(x)} \alpha(x) \times f(u_1, \ldots, u_n) + \beta(x) \times \text{fuel}(u_1, \ldots, u_n) + \gamma(x) \sum_{i=1}^{n} (u_i - u_{is})^2$$

where $u_i(x), \ldots, u_n(x)$ represent tractive efforts (e.g., power outputs) of the propulsion-generating vehicles 104 numbered 1 through n in the vehicle system 100 that are to be determined by changing the synchronous operational settings (where n represents the number of vehicles 104 having operational settings that are to be modified). For example, $\mu_i(x), \ldots, u_n(x)$ may represent the variables in the above Equation #7 that are to be solved for and used to determine the asynchronous operational settings. The variable $u_i(x)$ represents the tractive effort provided by the $i^{th}$ propulsion-generating vehicle 104 in the vehicle system 100 at the location (x) using asynchronous operational settings while the variable $u_{is}(x)$ represents the tractive effort provided by the $i^{th}$ propulsion-generating vehicle 104 in the vehicle system 100 at the location (x) using synchronous operational settings. When the tractive efforts $\mu_i(x), \ldots, u_n(x)$ are determined, then the operational settings that are associated with the tractive efforts $u_i(x), \ldots, u_n(x)$ may be determined (e.g., by identifying which throttle and/or brake settings provides the associated efforts $u_i(x), \ldots,$ $u_n(x)$). Optionally, the variables $u_i(x), \ldots, u_n(x)$ can include or represent the braking efforts provided by the vehicles 104 and/or 106 of the vehicle system 100. The variable x represents a location or distance along the route 102, and may change for different locations for which the tractive efforts $u_i(x), \ldots, u_n(x)$ are being determined.

The function $f( )$ can represent a function that captures (e.g., mathematically represents) handling of the vehicle system 100, and is referred to as a vehicle handling function. While the vehicle handling function is shown in Equation #7 as being dependent on the tractive efforts $u_i(x), \ldots, u_n(x)$ of the propulsion-generating vehicles 104, the vehicle handling function may additionally or alternatively be dependent on one or more other factors, such as terrain (e.g., grade and/or curvature of the route 102), a make up of the vehicle system 100 (e.g., the distribution of weight, propulsion-generating vehicles 104, and/or non-propulsion generating vehicles 106 in the vehicle system 100), and/or speeds of the vehicle system 100 using the synchronous operational settings.

The function fuel( ) can represent a function that captures (e.g., mathematically represents) how much fuel is consumed by the vehicle system 100 (e.g., by the propulsion-generating vehicles 104) when the tractive efforts $u_1(x), \ldots, u_n(x)$ are generated by the propulsion-generating vehicles 104 at the respective locations (x) along the route 102.

The variables α, β, and γ in Equation #7 can represent tuning parameters that may be manually or autonomously changed in order to control the relative weights of different terms in the equation. The variable α(x) can represent a tuning parameter that is based on the total variation or other variation in the grade of the route 102 beneath the vehicle system 100 at a location (x) along the route 102. For example, the variable α(x) can represent roughness of the route 102, which can be defined as:

$$\alpha(x) = \sum_{i=1}^{n-1} |g_i - g_{i+1}| \qquad \text{(Equation \#8)}$$

where $g_i$ represents the grade of the route 102 underneath the $i^{th}$ vehicle 104 or 106 at the location or distance (x). Optionally, the grade can be scaled by mass of the vehicles 104, 106 in the above Equation #8. In one embodiment, one or more of the variables α, β, and γ may be based on vehicle data and/or route data. For example, α, β, and/or γ may be expressed as a function of the type of vehicles in the vehicle system, the age and/or health of the vehicles, the tractive and/or braking output capabilities of the vehicles, the size of the vehicle system, and the like. As another example, α, β, and/or γ may be expressed as a function of the location of the vehicle system and/or the terrain over which the vehicle system is currently located. As another example, α, β, and/or γ may be expressed as a function of the type, age, and/or health of couplers in the vehicle system.

The variables α, β, and γ may have values that change in order to alter the relative importance (e.g., weight) in the equation on handling of the vehicle system 100, fuel consumption of the vehicle system 100, and how far or close the asynchronous operational settings should remain to the synchronous operational settings (e.g., the degree of change in the operational settings that is allowed to occur). In one example, the values of the variables α, β, and γ may be α(x)=1, β(x)=0, and γ(x)=0, which can result in only the handling performance of the vehicle system 100 being improved, while the impact of changing the operational settings on fuel consumption and the difference between the synchronous and asynchronous operational settings are essentially ignored.

The values of the variables α, β, and γ may change based on distance (x) along the route 102. For example, if α(x) is represented by Equation #8, then the values of β(x) and γ(x) to be nonzero constants can cause more emphasis to be placed on the vehicle handling function in Equation #7 in locations where the terrain beneath the route 102 is relatively more difficult (e.g., variations in the grade are more severe and/or more frequent).

As described above, different values of tractive efforts $u_i(x), \ldots, u_n(x)$ may be inserted into Equation #7 in order to identify tractive efforts $u_i(x), \ldots, u_n(x)$ (e.g., and associated asynchronous operational settings) that reduce one or more of the handling parameters relative to the synchronous operational settings at one or more locations (x) along the route 102. In one embodiment, the potential values of the tractive efforts $u_i(x), \ldots, u_n(x)$ may be limited based on constraints, such as upper and lower magnitude limits and rate bounds (e.g., limitations on how quickly the tractive efforts can change with respect to distance).

Also as described above, because the variable $u_i(x)$ represents the tractive effort provided by the $i^{th}$ propulsion-generating vehicle 104 in the vehicle system 100 at the location (x) using asynchronous operational settings and the variable $u_{is}(x)$ represents the tractive effort provided by the $i^{th}$ propulsion-generating vehicle 104 in the vehicle system 100 at the location (x) using synchronous operational settings, then a constraint that may applied to Equation #7 may be that the values of $u_i(x)$ may need to satisfy the following so that the total effort or total power output of the vehicle system 100 is not decreased by changing from the synchronous operational settings associated with $u_{is}(x)$ to the asynchronous operational settings associated with $u_i(x)$:

$$\sum_{i=1}^{n} u_i(x) = \sum_{i=1}^{n} u_{is}(x) \qquad \text{(Equation \#9)}$$

The vehicle handling function $f(\ )$ can be determined by attempting to reduce or minimize one or more of the handling parameters using different asynchronous operational settings (that result in different tractive efforts $u_i(x), \ldots, u_n(x)$ being provided by the propulsion-generating vehicles 104) at one or more locations along the route 102. With respect to the coupler parameters, one or more functions representative of coupler forces or energy stored in the couplers 108 may be used to reduce or minimize the coupler parameters. These functions may be applied to the couplers 108 over the entire vehicle system 100, within a segment of the vehicle system 100, and/or between the first leading propulsion-generating vehicle 104A and the last trailing propulsion-generating vehicle 104G. By way of example only, these functions may include a sum of squares of the forces that are estimated to be exerted on the couplers 108, the maximum value of the forces exerted on the couplers 108 and/or energies stored in the couplers 108, the minimum value of the forces exerted on the couplers 108 and/or energies stored in the couplers 108, the maximum absolute value of the forces exerted on the couplers 108 and/or energies stored in the couplers 108, the sum of the forces exerted on the couplers 108 and/or energies stored in the couplers 108, the absolute sum of the forces exerted on the couplers 108 and/or energies stored in the couplers 108, and the like. Equations 1 and 2 above represent a couple of examples of such functions.

With respect to the terrain excitation parameters, one or more functions representative of the terrain excitation parameters may be used to reduce or minimize the terrain excitation parameters. For example, different combinations of tractive efforts $u_i(x), \ldots, u_n(x)$ may be used in attempts to determine which combination results in a function of the terrain excitation parameters being reduced or minimized. One example of such a function includes:

$$f(\mu) = \sum_{k=1}^{N} e(k)^2 \qquad \text{(Equation \#10)}$$

where $e(k)^2$ represents the square of the terrain excitation parameter for the $k^{th}$ vehicle 104, 106 in the vehicle system 100 including N vehicles 104, 106. The sum of the squares may be determined for the entire vehicle system 100, within a segment of the vehicle system 100, and/or between the first leading propulsion-generating vehicle 104A and the last trailing propulsion-generating vehicle 104G.

Another example of a function of the terrain excitation parameters includes:

$$f(\mu) = \max_{k} |e(k)| \qquad \text{(Equation \#11)}$$

Such a function determines the maximum terrain excitation parameter and may be used to identify the largest terrain excitation parameter in the entire vehicle system 100, within a segment of the vehicle system 100, and/or between the first leading propulsion-generating vehicle 104A and the last trailing propulsion-generating vehicle 104G.

Another example of a function of the terrain excitation parameters includes:

$$f(\mu) = \Sigma |e(k)| \qquad \text{(Equation \#12)}$$

Such a function determines the sum of the terrain excitation parameters and may be used to identify the sum of the terrain excitation parameters in the entire vehicle system 100, within a segment of the vehicle system 100, and/or between the first leading propulsion-generating vehicle 104A and the last trailing propulsion-generating vehicle 104G.

With respect to the node parameters, different combinations of tractive efforts $u_i(x), \ldots, u_n(x)$ may be used in attempts to determine which combination results in the number of nodes being reduced or minimized and/or which combination results in the rate of movement of one or more nodes being reduced or minimized.

With respect to the neighboring velocity parameters, one or more functions representative of the neighboring velocity parameters may be used to reduce or minimize the neighboring velocity parameters. For example, different combinations of tractive efforts $u_i(x), \ldots, u_n(x)$ may be used in attempts to determine which combination results in a function of the neighboring velocity parameters being reduced or minimized. One example of such a function includes:

$$f(v) = \sum_{i=1}^{N-1} (v_i - v_{i+1})^2 \qquad \text{(Equation \#13)}$$

where $v_i$ represents the velocity of the $i^{th}$ vehicle 104 or 106 in the vehicle system 100 having N vehicles 104, 106 and the term $(v_i-v_{i+1})$ represents the difference in velocities of neighboring vehicles 104 and/or 106.

Another example of a function of the neighboring velocity parameters includes:

$$f(v) = \max |v_i - v_{i+1}| \qquad \text{(Equation \#14)}$$

Such a function determines the maximum difference in velocities of the neighboring vehicles 104 and/or 106 and may be used to identify the neighboring velocity parameter in the entire vehicle system 100, within a segment of the vehicle system 100, and/or between the first leading propulsion-generating vehicle 104A and the last trailing propulsion-generating vehicle 104G.

When the tractive efforts and/or braking efforts $u_i(x), \ldots, u_n(x)$ are identified at one or more locations along the route 102 that reduce the handling parameters relative to the synchronous operational settings, the asynchronous operational settings that correspond to the identified the tractive efforts and/or braking efforts $u_i(x), \ldots, u_n(x)$ are determined. For example, the throttle settings and/or brake settings that are needed for each of the propulsion-generating vehicles 104 to provide the identified tractive efforts and/or braking efforts $u_i(x), \ldots, u_n(x)$ are determined, such as from a table, listing, previously determined relationship between the efforts and the settings, or the like. Flow of the method 200 then proceeds to 210.

At 210, a determination is made as to whether one or more of the asynchronous operational settings can be modified in order to achieve or improve upon a trip objective. As described above, a trip objective can include a reduction in fuel consumption, emission generation, and/or travel time. If one or more of the asynchronous operational settings can be changed in order to reduce fuel consumption, emission generation, and/or travel time (relative to not changing the asynchronous operational settings) while avoiding significant decreases in the improvement in vehicle handling (that is achieved by using the asynchronous operational settings), then the asynchronous operational settings may be modified. On the other hand, if changing the asynchronous operational settings would not result in achieving or improving upon a trip objective, then the asynchronous operational settings may not be changed.

Figure 5:
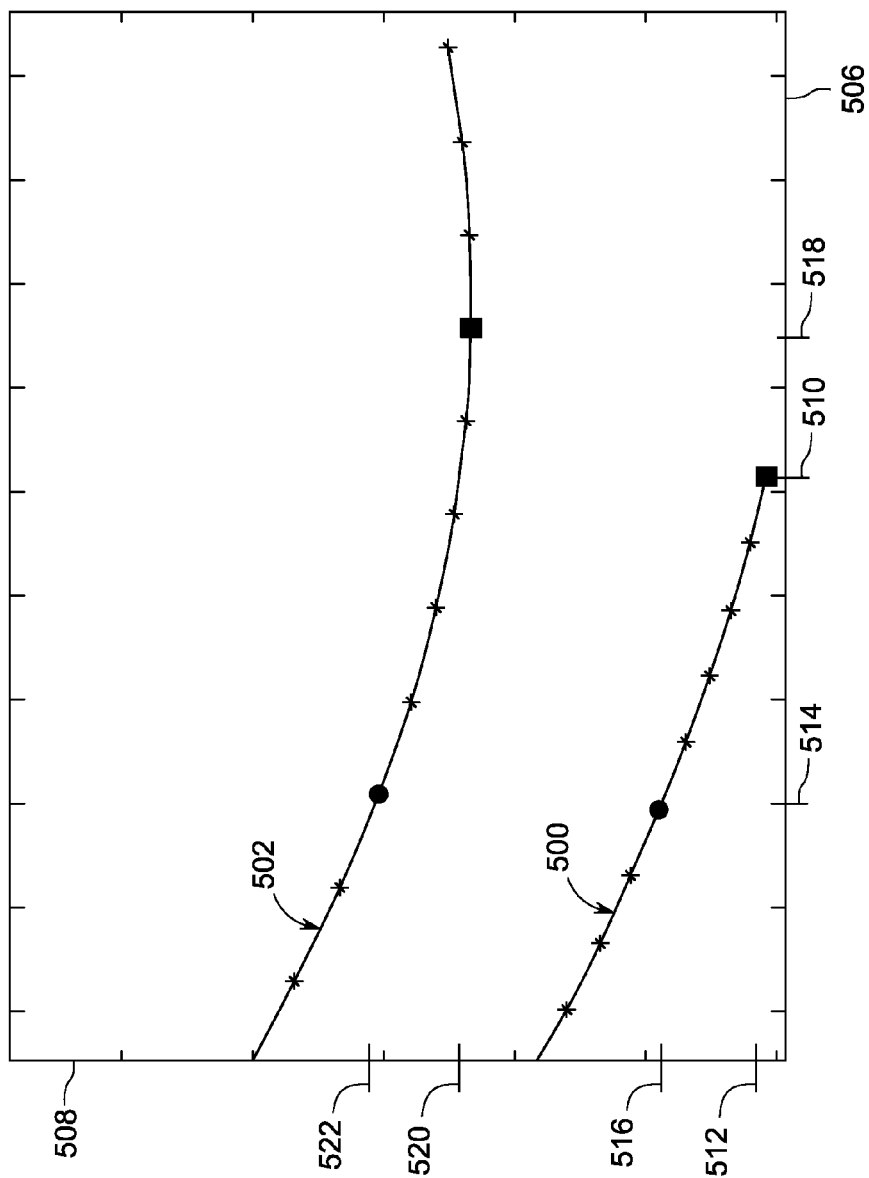
FIG. 5 illustrates two relationships between different asynchronous operational settings and a handling parameter at two different locations along the route 102 shown in FIG. 1 in accordance with one example.

FIG. 5 illustrates two relationships 500, 502 between different asynchronous operational settings and a handling parameter at two different locations along the route 102 (shown in FIG. 1) in accordance with one example. The relationships 500, 502 may each represent how a handling parameter (e.g., a coupler parameter representative of an amount of energy stored in one or more, or all, of the couplers 108 in the vehicle system 100 shown in FIG. 1) varies at each the two different locations if the operational setting (e.g., a throttle setting for a propulsion-generating vehicle 104) is changed. The relationships 500, 502 are shown alongside a horizontal axis 506 representative of the operational parameter and a vertical axis 508 representative of the handling parameter.

For example, the relationship 500 may represent how the handling parameter is expected to change if the operational setting is changed at a first location along the route 102. As shown in FIG. 5, a previous synchronous operational setting may be changed to an asynchronous operational setting at a first value 510 to cause the handling parameter to be minimized or otherwise reduced to a lower value 512 at the first location along the route 102. Changing the first value 510 of the asynchronous operational setting to a second value 514 may achieve or improve upon a trip objective, such as by reducing the throttle setting in order to reduce the amount of fuel consumed by the vehicle system 100. This change, however, also causes the handling parameter to be increased from the lower value 512 to an upper value 516.

The determination of whether to decrease the operational setting to the value 514 may be based on one or more thresholds. For example, if this change in operational setting results in a reduction in fuel consumption and/or a reduction in the amount of emissions generated that is greater than one or more designated threshold amounts, and the change does not result in the handling parameter increasing by more than a designated threshold amount from the lower value 512 to the upper value 516 and/or cause the vehicle system 100 to travel slower than a designated speed or produce less than a designated total power output, then the change may be implemented. If, however, the change results in a reduction in fuel consumption and/or emissions generation that is smaller than a threshold amount, the handling parameter increasing by more than a threshold amount, and/or the vehicle system 100 to travel slower than a designated speed and/or produce less than a designated total power, then the change may not be made to the previously identified asynchronous operational setting.

As another example, the relationship 502 may represent how the handling parameter is expected to change if the operational setting is changed at a different, second location along the route 102. As shown in FIG. 5, a previous synchronous operational setting may be changed to an asynchronous operational setting at a third value 518 to cause the handling parameter to be minimized or otherwise reduced to a lower value 520 at the second location along the route 102. As shown by the relationship 502, increasing or decreasing the operational setting will cause the handling parameter to increase. Increasing the operational setting may not be permitted as doing so may cause the vehicle system 100 to consume excess fuel and/or generate increased emissions. Therefore, the operational setting may be decreased. In one embodiment, the operational setting may be decreased until the handling parameter is increased by no more than a threshold amount or by no more than a designated threshold value. For example, the operational setting may be decreased until the lower value 520 of the handling parameter is increased to an upper limit 522 on the handling parameter.

Returning to the description of the method 200 shown in FIG. 2, at 210, if the asynchronous operational setting can be modified at one or more locations along the route 102 to achieve or improve upon a trip objective, then flow of the method 200 may proceed to 212. Otherwise, the method 200 may proceed to 214.

At 212, the asynchronous operational settings are modified at one or more locations along the route 102. For example, after determining the asynchronous operational settings and determining that the asynchronous operational settings can be changed to achieve or improve upon a trip objective, the asynchronous operational settings that can be changed are modified. As a result, the modified asynchronous operational settings that are so determined can provide at least the total power output that is dictated by the synchronous trip plan at various locations along the route 102, but also improve upon the handling of the vehicle system 100 relative to the synchronous trip plan and achieve one or more trip objectives relative to the synchronous trip plan.

At 214, the asynchronous operational settings (e.g., the asynchronous operational settings that were modified or that were not modified) are used to asynchronously control operations of the vehicle system 100. For example, the asynchronous operational settings can be used to autonomously control operations of the propulsion-generating vehicles 104 along the route 102. Alternatively, the asynchronous operational settings can be used to direct an operator to manually control operations of the propulsion-generating vehicles 104 along the route 102 according to the asynchronous operational settings.

Figure 6:
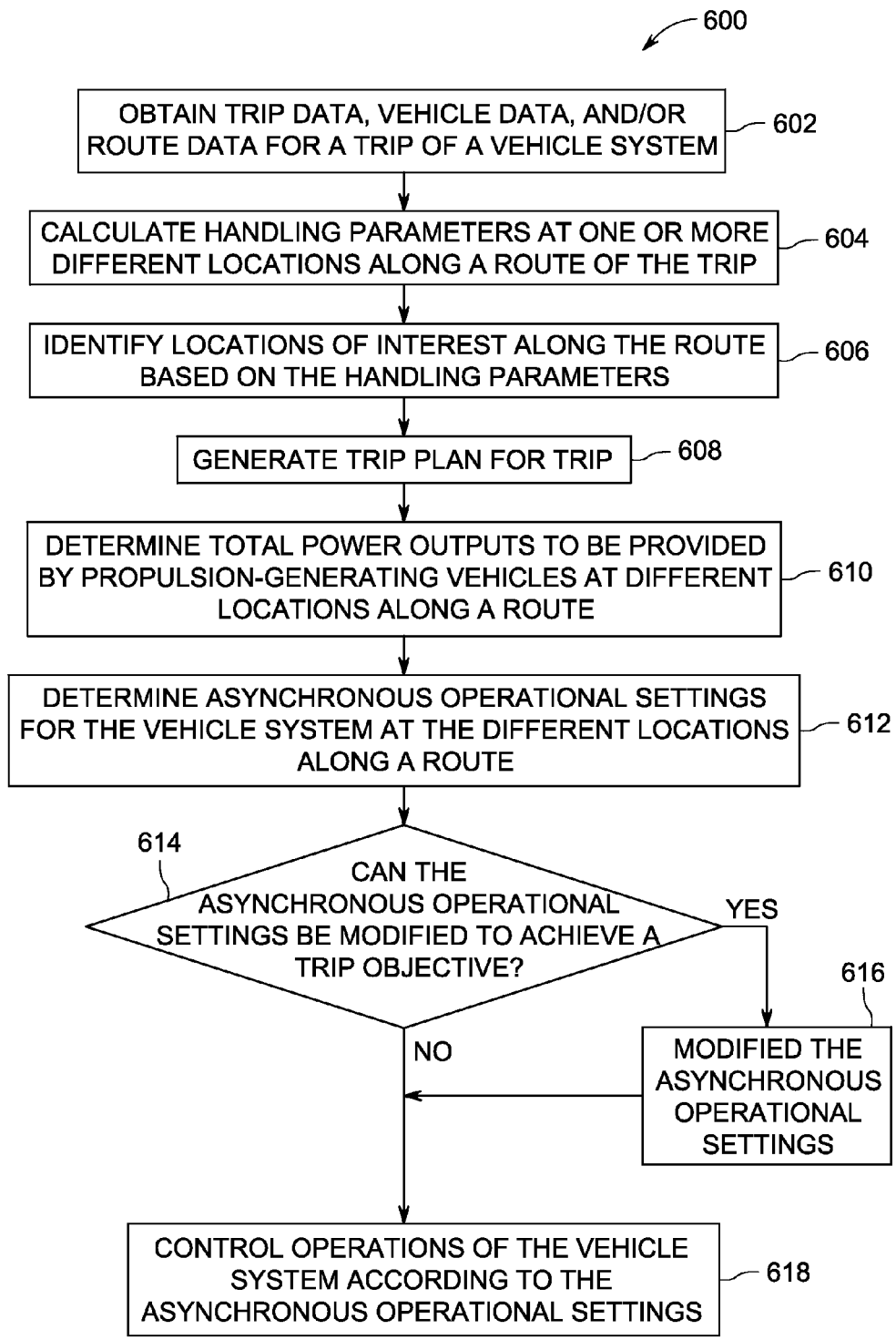
FIG. 6 is a flowchart of another embodiment of a method for operating the vehicle system shown in FIG. 1.

FIG. 6 is a flowchart of another embodiment of a method 600 for operating the vehicle system 100 shown in FIG. 1. The method 600 may be used in conjunction with the vehicle system 100. For example, the method 600 may be used to identify asynchronous operational settings for the vehicle system 100 when no synchronous trip plan is available or is not used to derive the asynchronous operational settings.

At 602, trip data representative of a trip to be traveled or currently being traveled by the vehicle system 100, vehicle data representative of the vehicle system 100, and/or route data representative of the route 102 of the trip are obtained. The data may be obtained from one or more memory devices disposed onboard and/or off-board of the vehicle system 100, such as from a dispatch facility.

At 604, handling parameters are calculated at one or more different locations along the route 102 of the trip. For example, one or more of the handling parameters described above can be estimated from a simulation of travel of the vehicle system 100 and/or from previous trips of the same or similar vehicle system 100 along the route 102. In one embodiment, the terrain excitation parameter is estimated for travel of the vehicle system 100 over the route 102. If throttle and/or brake settings are needed to determine the handling parameters, then default values, historical values (e.g., settings used during a previous trip over the route 102), and/or other values may be used to estimate the handling parameters.

At 606, one or more locations of interest along the route 102 are identified based on the handling parameters. A location of interest may represent a section of the route 102 that may be relatively difficult or complex to control operations of the vehicle system 100 while providing improved handling relative to one or more other sections of the route 102. For example, a section of the route 102 having undulating terrain may be more difficult or complex to control the vehicle system 100 over with improved handling relative to the vehicle system 100 traveling over a relatively flat section of the route 102. In one embodiment, the locations of interest are identified when the handling parameters that are calculated at 604 exceed one or more designated thresholds. For example, the locations along the route 102 where the handling parameters are calculated to be relatively large may be identified as locations of interest.

At 608, a trip plan is created for the trip along the route 102. For example, a trip plan having synchronous operational settings for the propulsion-generating vehicles 104 at various locations along the route 102 may be created. As described above, in one embodiment, the trip plan may be created using one or more embodiments of the subject matter described in the '354 Application. The trip plan may be created using the trip data, vehicle data, and/or route data and may reduce fuel consumed, emissions generated, and/or travel time for the trip relative to the vehicle system 100 traveling along the route 102 for the trip according to another, different trip plan having different synchronous operational settings.

In one embodiment, the trip plan may be created subject to one or more constraints placed on the operational settings used at the locations of interest. For example, a reduced speed limit (e.g., relative to a government or landowner-mandated speed limit) may be applied to the locations of interest and/or a minimum speed limit that the vehicle system 100 is required to maintain may be applied to the locations of interest. Alternatively or additionally, limitations on how often throttle and/or brake settings can be changed in the locations of interest can be placed on the trip plan. Other limitations on movements and/or control of the vehicle system 100 may be applied as well. The trip plan may then be created so that the synchronous operational settings of the trip plan abide by these restrictions on the locations of interest. For example, the trip plan may be created so that the vehicle system 100 is not directed to travel faster than upper speed limits or slower than minimum speed limits at the associated locations of interest.

At 610, total power outputs that are to be provided by the vehicle system 100 are determined at the locations along the route 102. For example, similar to 206 of the method 200 shown in FIG. 2, the total power outputs that are to be provided, in the aggregate, by the propulsion-generating vehicles 104 in the vehicle system 100 may be determined for at least some, or all, the same locations at which the handling parameters are determined at 204.

At 612, asynchronous operational settings for the vehicle system 100 are determined. For example, similar to 208 of the method 200, the total power outputs can be distributed among the propulsion-generating vehicles 104 in the vehicle system 100 at the locations and based on the handling parameters by determining different operational settings for different vehicles 104, 106 at these locations. The total power outputs of the synchronous trip plan may be distributed among the propulsion-generating vehicles 104 by designating the same throttle and/or brake settings for each of the propulsion-generating vehicles 104. Using the handling parameters that are determined at the locations along the route 102, the same total power outputs at these locations can be distributed among the propulsion-generating vehicles 104 by designating different throttle and/or brake settings for the propulsion-generating vehicles 104.

At 614, a determination is made as to whether one or more of the asynchronous operational settings can be modified in order to achieve or improve upon a trip objective. For example, similar to 210 of the method 200, if one or more of the asynchronous operational settings can be changed in order to reduce fuel consumption, emission generation, and/or travel time (relative to not changing the asynchronous operational settings) while avoiding significant decreases in the improvement in vehicle handling (that is achieved by using the asynchronous operational settings), then the asynchronous operational settings may be modified. On the other hand, if changing the asynchronous operational settings would not result in achieving or improving upon a trip objective, then the asynchronous operational settings may not be changed. If the asynchronous operational setting can be modified at one or more locations along the route 102 to achieve or improve upon a trip objective, then flow of the method 600 may proceed to 616. Otherwise, the method 600 may proceed to 614.

At 616, the asynchronous operational settings are modified at one or more locations along the route 102. For example, similar to 212 of the method 200, after determining the asynchronous operational settings and determining that the asynchronous operational settings can be changed to achieve or improve upon a trip objective, the asynchronous operational settings that can be changed are modified. As a result, the modified asynchronous operational settings that are so determined can provide at least the total power output that is dictated by the synchronous trip plan at various locations along the route 102, but also improve upon the handling of the vehicle system 100 relative to the synchronous trip plan and achieve one or more trip objectives relative to the synchronous trip plan.

At 618, the asynchronous operational settings are used to asynchronously control operations of the vehicle system 100. For example, similar to 214 of the method 200, the asynchronous operational settings can be used to autonomously control operations of the propulsion-generating vehicles 104 along the route 102. Alternatively, the asynchronous operational settings can be used to direct an operator to manually control operations of the propulsion-generating vehicles 104 along the route 102 according to the asynchronous operational settings.

In another embodiment, instead of determining the asynchronous operational settings from a synchronous trip plan and/or determining the asynchronous operational settings at the locations associated with larger handling parameters, a trip plan may be created in order to "optimize" (e.g., improve) the handling of the vehicle system 100 and one or more trip objectives. For example, a trip plan may be created from the trip data, vehicle data, route data, and/or handling parameters, with the trip plan decreasing the handling parameters at locations along the route 102 while also reducing fuel efficiency, reducing the generation of emissions, and/or reducing travel time of the trip, as described herein. For example, the trip plan may be created a single time with the objectives of improving both handling and improving one or more objectives of the trip.

Figure 7:
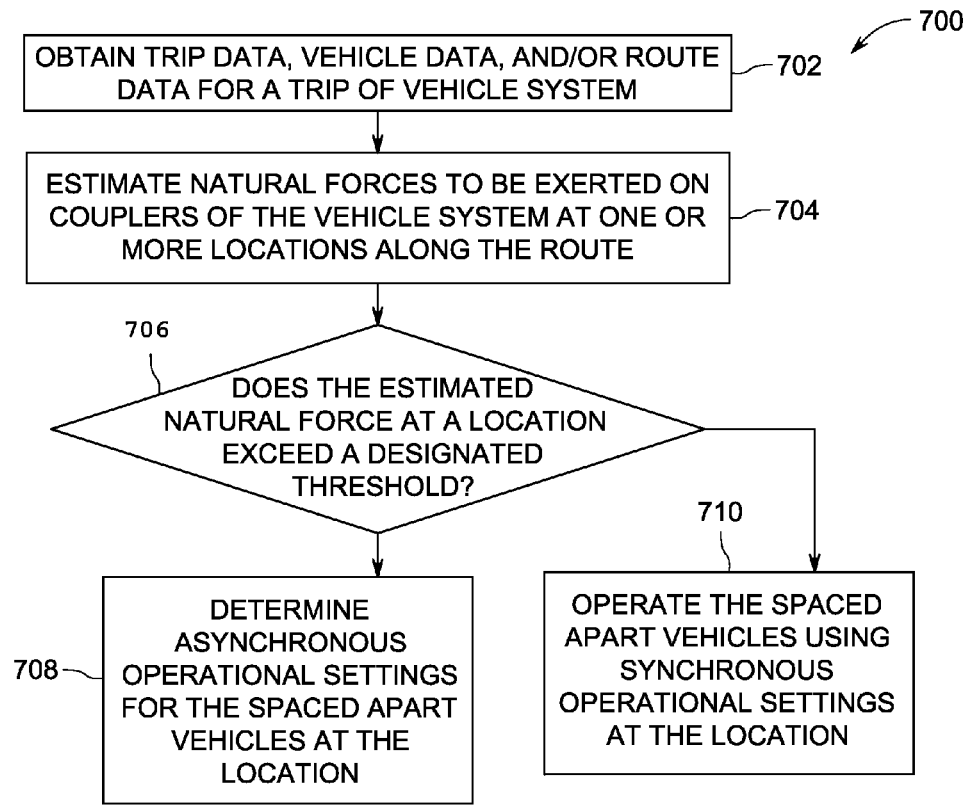
FIG. 7 is a flowchart of another embodiment of a method for operating the vehicle system shown in FIG. 1.

FIG. 7 is a flowchart of another embodiment of a method 700 for operating the vehicle system 100 shown in FIG. 1. The method 700 may be used in conjunction with the vehicle system 100. For example, the method 700 may be used to identify asynchronous operational settings for the vehicle system 100 when no synchronous trip plan is available or is not used to derive the asynchronous operational settings.

At 702, trip data representative of a trip to be traveled or currently being traveled by the vehicle system 100, vehicle data representative of the vehicle system 100, and/or route data representative of the route 102 of the trip are obtained. The data may be obtained from one or more memory devices disposed onboard and/or off-board of the vehicle system 100, such as from a dispatch facility. A trip plan formed from synchronous operational settings for the propulsion-generating vehicles 104 may be created from the trip data, vehicle data, and/or route data, as described above, or received from an off-board source. Alternatively, the route data alone may be obtained at 702.

At 704, natural forces that are to be exerted on the vehicle system 100 during travel along the route 102 during the trip are estimated. The natural forces exerted on the vehicle system 100 may be handling parameters that are used to determine operational settings for the propulsion-generating vehicles 104 and to improve the handling of the vehicle system 100. The natural forces include the forces exerted on the couplers 108 (e.g., as predicted by a rigid rope model of the vehicle system 100 when only the gravitational forces on the vehicle system 100 are considered). These estimated natural forces may be dependent on the terrain and may be independent of the propulsion-generating vehicles 104 (e.g., independent of the tractive efforts generated by the vehicles 104), drag forces, air-brake forces, and/or other operational parameters. The natural forces may be estimated for one or more couplers 108 disposed between propulsion-generating vehicles 104 in the vehicle system 100. In one embodiment, the natural forces are determined for a segment of the vehicle system 100 that includes one or more non-propulsion generating vehicles 106 that are disposed between and that interconnect two or more propulsion-generating vehicles 104. Alternatively or additionally, the natural forces may be determined for the entire vehicle system 100 and/or for multiple segments of the vehicle system 100.

The natural forces exerted on couplers 108 may be estimated using route data that is representative of the route 102 (e.g., curvature and/or grade), and/or vehicle data that is representative of the size (e.g., mass) of the vehicle system 100 and/or a segment of the vehicle system 100:

$$F_{i-1} - F_i = m_i g_i + m_i \dot{v} \qquad \text{(Equation \#15)}$$

where $F_i$ represents the natural force exerted on the $i^{th}$ coupler 108 in the vehicle system 100, $F_{i-1}$ represents the natural force exerted on the $(i-1)^{th}$ coupler 108 in the vehicle system 100, $m_i$ represents the mass of the vehicle 104 or 106, $g_i$ represents the mean, average, or effective grade of the route 102 beneath the vehicle system 100, and $\dot{v}$ represents the acceleration of the vehicle system 100. The acceleration ($\dot{v}$) may be the acceleration that is caused by gravitational force and can be represented as:

$$\dot{v} = \frac{\sum_{i=1}^{N} m_i g_i}{\sum_{i=1}^{N} m_i} \qquad \text{(Equation \#16)}$$

As a result, the natural force exerted on the $i^{th}$ coupler 108 may be defined as:

$$F_i = \sum_{j=1}^{i} m_j g_j + m_j \dot{v} \qquad \text{(Equation \#17)}$$

If the natural force is positive at a coupler 108 (e.g., greater than zero), the natural force can indicate that gravity tends to stretch the coupler 108. Conversely, if the natural force is negative at the coupler 108 (e.g., less than zero), the natural force can indicate that gravity tends to compress the coupler 108. The estimated natural forces can be used to determine a differential power (or effort) between the propulsion-generating vehicles 104 on opposite sides of the coupler 108 (but not necessarily directly connected to the coupler 108).

In one embodiment, the natural forces are used to determine a bunching power for the propulsion-generating vehicles 104 that are on opposite sides of the coupler 108. The bunching power can represent the total differential power output with respect to a synchronous power output that is to be generated by these propulsion-generating vehicles 104. For example, the bunching power can represent a total difference between the power output of the vehicles (as calculated using one or more methods described herein) and the power output of the vehicles if the vehicles were using synchronous operational settings. As one example, the bunching power can be expressed as:

$$B = \begin{cases} K(p-n) & \text{if } |p-n| > t \\ 0 & \text{otherwise} \end{cases} \qquad \text{(Equation \#18)}$$

where k represents a spring constant of the spring model of the coupler 108, p represents a positive natural force (e.g., the maximum positive natural force) exerted on the coupler 108, n represents an absolute value of a negative natural force (e.g., the maximum absolute negative natural force) exerted on the coupler 108, B represents an estimated bunching effort or power, and t represents a designated threshold.

As a result, if the positive natural force p is larger than the threshold t plus the absolute negative natural force n, then the estimated bunching effort or power B is proportional to the difference between the positive natural force and the absolute value of the negative natural force. If the absolute negative natural force n is larger than the threshold t plus the positive natural force p, then the estimated bunching effort or power B is proportional to the difference between the positive natural force and the absolute value of the negative natural force. Otherwise, the estimated bunching effort or power B is set to zero.

When the natural force on a coupler 108 is larger than the natural compressive force on the coupler 108, the bunching effort B is positive, which can indicate that the vehicle system 100 can be compressed to compensate for the gravity stretching the vehicle system 100. Similarly, when the natural compressive force is larger than the natural stretch force on the coupler 108, the bunching effort B is negative, which can indicate that the vehicle system 100 can be stretched to compensate for the natural forces.

At 706, a determination is made as to whether the estimated natural force on one or more couplers 108 exceeds a designated threshold. For example, the natural force that is estimated to be exerted on a coupler 108 at a location along the route 102 may be compared to a threshold. If the natural force exceeds a designated threshold, then the natural force may be sufficiently large to warrant designating different operational settings (e.g., asynchronous operational settings) for the propulsion-generating vehicles 104 disposed on opposite sides of the coupler 108 in order to compensate for the natural force. Such relatively large natural forces may decrease handling of the vehicle system 100 and may be undesirable for the control of the vehicle system 100. If the estimated natural force indicates that the coupler 108 may experience a relatively large tensile force at a location along the route 102, then the operational settings of the propulsion-generating vehicles 104 may be designated to compress the coupler 108. Alternatively, if the estimated natural force indicates that the coupler 108 may experience a relatively large compressive force at a location along the route 102, then the operational settings of the propulsion-generating vehicles 104 may be designated to stretch the coupler 108. As a result, flow of the method 700 may proceed to 708.

On the other hand, if the estimated natural force does not exceed the threshold, then the natural force may not be sufficiently large to warrant designating asynchronous operational settings for the propulsion-generating vehicles 104 disposed on opposite sides of the coupler 108 in order to compensate for the natural force. For example, if the estimated natural force indicates that the coupler 108 may experience a relatively small tensile or compressive force, then the natural force may not significantly impact the handling of the vehicle system 100 in a negative or undesirable manner. As a result, flow of the method 700 may proceed to 710.

At 708, asynchronous operational settings for the propulsion-generating vehicles 104 disposed on opposite sides of the coupler 108 are determined. The asynchronous operational settings may be based on the bunching effort or horsepower. For example, the asynchronous operational settings may be determined so that the total (e.g., aggregate) power output that is to be generated by the propulsion-generating vehicles 104 on opposite sides of the coupler 108 is the bunching effort or horsepower. The bunching effort or horsepower may be the effort (B) determined above using Equation #18 or another effort or horsepower that reduces the estimated natural force on the coupler 108. The asynchronous operational settings may be used to control operations of the propulsion-generating vehicles 104, such as by automatically implementing the asynchronous operational settings or by directing an operator of the vehicle system 100 to manually implement the asynchronous operational settings at the location associated with the estimated natural force on the coupler 108.

At 710, the propulsion-generating vehicles 104 disposed on opposite sides of the coupler 108 for which the natural force is estimated are controlled using synchronous (e.g., the same) operational setting, such as the same throttle settings. For example, because the estimated natural force may be relatively small, the synchronous operational settings of a trip plan may be used for the propulsion-generating vehicles 104 instead of changing the operational settings to asynchronous operational settings.

Figure 8:
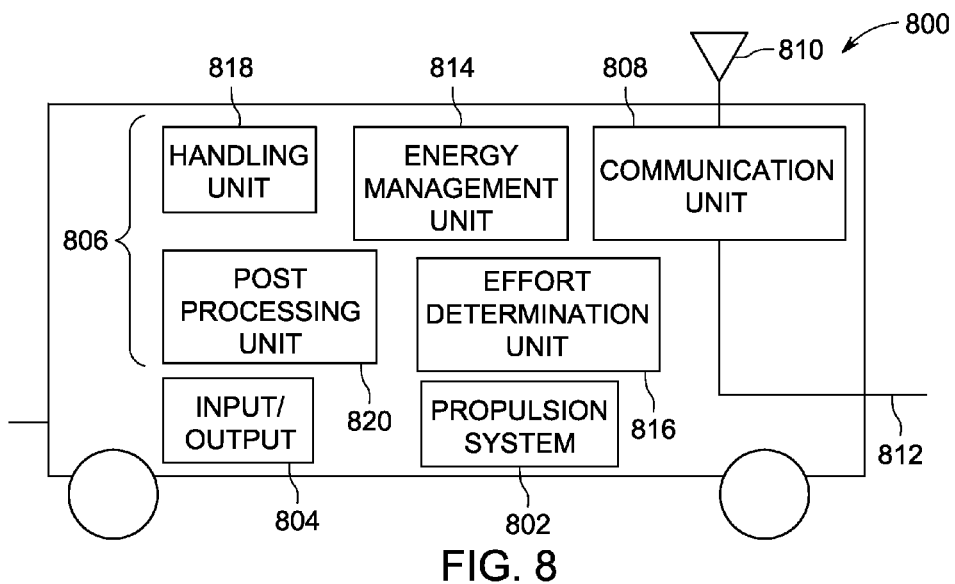
FIG. 8 is a schematic diagram of one embodiment of a propulsion-generating vehicle.

FIG. 8 is a schematic diagram of one embodiment of a propulsion-generating vehicle 800. The propulsion-generating vehicle 800 may represent one or more of the propulsion-generating vehicles 104 shown in FIG. 1. The propulsion-generating vehicle 800 includes a propulsion system 802, which can include one or more engines, motors, brakes, batteries, cooling systems (e.g., radiators, fans, etc.), and the like, that operate to generate power output to propel the vehicle 800. One or more input and/or output devices 804 ("Input/Output 804" in FIG. 8), such as keyboards, throttles, switches, buttons, pedals, microphones, speakers, displays, and the like, may be used by an operator to provide input and/or monitor output of one or more systems of the vehicle 800.

The propulsion-generating vehicle 800 includes an onboard control system 806 that controls operations of the propulsion-generating vehicle 800. For example, the control system 806 may determine the asynchronous operational settings for the vehicle 800 and at least one other propulsion-generating vehicle in the same vehicle system. Alternatively, the control system 806 may entirely or partially be disposed off-board the vehicle 800, such as at a dispatch facility or other facility. The vehicle system 100 (shown in FIG. 1) that may include the propulsion-generating vehicle 800 may include only a single vehicle 800 having the control system 806 that receives or determines the asynchronous operational settings described herein. Alternatively, the vehicle system 100 may have multiple vehicles 800 with the control systems 806 that receive or determine the asynchronous operational settings.

Other propulsion-generating vehicles in the vehicle system 100 may be controlled based on the asynchronous operational settings that are communicated from the propulsion-generating vehicle 800 that has the control system 806 in order to control the operations of the other propulsion-generating vehicles. Alternatively, several propulsion-generating vehicles 800 in the vehicle system 100 may include the control systems 806 and assigned priorities among the control systems 806 may be used to determine which control system 806 controls operations of the propulsion-generating vehicles 800.

The control system 806 is communicatively coupled with a communication unit 808. The communication unit 808 communicates with one or more off-board locations, such as another vehicle (e.g., another propulsion-generating vehicle in the same vehicle system 100, a dispatch facility, another vehicle system, or the like). The communication unit 808 can communicate via wired and/or wireless connections (e.g., via radio frequency). The communication unit 808 can include a wireless antenna 810 and associated circuitry and software to communicate wirelessly. Additionally or alternatively, the communication unit 808 may be connected with a wired connection 812, such as one or more buses, cables, and the like, that connect the communication unit 808 with another vehicle in the vehicle system or consist (e.g., a trainline, multiple unit cable, electronically controlled pneumatic brake line, or the like). The communication unit 808 can be used to communicate (e.g., transmit and/or receive) a variety of information described herein. For example, the communication unit 808 can receive the trip plan having synchronous operational settings, trip data, route data, vehicle data, operational settings from another propulsion-generating vehicle 800 and/or another control unit 806, and/or other information that is used to determine the handling parameters and asynchronous operational settings described herein. The communication unit 808 can transmit asynchronous operational settings, such as the asynchronous operational settings determined by the control system 806 and/or received from an off-board source, to one or more other propulsion-generating vehicles in the vehicle system 100. These transmitted asynchronous operational settings are used to direct the operations of the other propulsion-generating vehicles.

The control system 806 includes units that perform various operations. The control system 806 and one or more of the units may represent a hardware and/or software system that operates to perform one or more functions described herein. For example, the control system 806 and/or the illustrated units may include one or more computer processor(s), controller(s), or other logic-based device(s) that perform operations based on instructions stored on a tangible and non-transitory computer readable storage medium. Alternatively, the control system 806 and/or the units may include one or more hard-wired devices that perform operations based on hard-wired logic of the devices. The control system 806 and/or the units shown in FIG. 8 may represent the hardware that operates based on software or hardwired instructions, the software that directs hardware to perform the operations, or a combination thereof.

In the illustrated embodiment, the control system 806 includes an energy management unit 814 that receives input to create a trip plan. For example, the energy management unit 814 may receive trip data, vehicle data, and/or route data in order to create a trip plan having synchronous operational settings. As described above, such a trip plan may be used to determine asynchronous operational settings to improve the handling of the vehicle system 100 and/or to identify locations of interest along the route 102 where the asynchronous operational settings are to be determined in order to improve handling. Additionally or alternatively, the energy management unit 814 may create the trip plan with asynchronous operational settings, and may do so by attempting to reduce one or more of the handling parameters while also reducing the fuel consumed by the vehicle system 100, the emissions generated by the vehicle system 100, and/or the travel time to complete the trip. For example, the energy management unit 814 may determine the asynchronous operational settings for the propulsion-generating vehicles 104, 800 of the vehicle system 100 at one or more locations along the route 102 in order to reduce the handling parameters, fuel consumed, emissions generated, and/or travel time relative to another trip plan for the same trip and same vehicle system 100 that includes synchronous operational settings at one or more of the locations. Optionally, the energy management unit 814 that determines the synchronous and/or asynchronous trip plan may be disposed off-board of the vehicle 800 and may communicate the trip plan to the control system 806.

An effort determination unit 816 examines the trip plan to determine the total power output demanded from the propulsion-generating vehicles 104, 800 in the vehicle system 100 by the trip plan at one or more locations along the route 102. For example, the effort determination unit 816 can identify the estimated or anticipated power outputs of each of the propulsion-generating vehicles based on the designated operational settings (e.g., throttle notch positions) in the trip plan and then sum these power outputs to determine the total power output to be provided by the vehicle system 100.

A handling unit 818 calculates one or more handling parameters described above. The handling unit 818 can estimate the values of the handling parameters at one or more locations along the route 102, as described above. The handling unit 818 can determine these handling parameters using the operational settings designated by the trip plan, also as described above.

A post processing unit 820 determines the asynchronous operational settings for two or more of the propulsion-generating vehicles in the vehicle system. For example, the post processing unit 820 can examine the total power outputs derived from the trip plan by the effort determination unit 816 and the handling parameters estimated by the handling unit 818. The post processing unit 820 may then determine asynchronous operational settings that improve handling of the vehicle system 100 (e.g., by reducing one or more of the handling parameters) while providing the total power outputs of the vehicle system 100, as described above. The post processing unit 820 may optionally determine if the asynchronous operational settings can be modified to achieve or improve upon one or more trip objectives, such as fuel consumption, travel time, emissions generation, and the like.

A controller unit 822 forms instructions that are based on the asynchronous operational settings to control movement of the propulsion-generating vehicle 800 and/or one or more other propulsion-generating vehicles in the vehicle system 100. For example, the controller unit 822 can create one or more data signals or packets that represent the asynchronous operational settings determined by the post processing unit 820. These instructions may be communicated to the propulsion system 802 of the vehicle 800 and/or to similar propulsion systems of other propulsion-generating vehicles in the same vehicle system 100 to autonomously control movements of the propulsion-generating vehicles. The propulsion systems that receive the instructions may automatically implement the throttle and/or brake settings dictated by the asynchronous operational settings. Optionally, the instructions may be communicated to the one or more output devices 804 of the vehicle 800 and/or one or more similar output devices on other propulsion-generating vehicles in the vehicle system 100 to direct one or more operators on how to manually change throttle and/or brake settings of the propulsion-generating vehicles according to the asynchronous operational settings.

In one embodiment, the controller unit 822 may determine the actual speed of the propulsion-generating vehicle 800 and/or one or more other propulsion-generating vehicles in the vehicle system 100. For example, the controller unit 822 may receive or measure data from the propulsion system 802 that represents the actual speed of the propulsion-generating vehicle 800. This data may be obtained from a speed sensor that is included in the propulsion system 802. Additionally or alternatively, the controller unit 822 may receive similar data from other propulsion-generating vehicles in the vehicle system 100.

The controller unit 822 can compare the actual speed of the propulsion-generating vehicle 800, the other propulsion-generating vehicles, and/or the vehicle system 100 (e.g., which may be represented by the actual speeds of one or more of the propulsion-generating vehicles) to a speed that is designated by a trip plan (e.g., a synchronous or asynchronous trip plan). If the actual speed differs from the designated speed, the controller unit 822 may identify a change in throttle settings and/or brake settings for one or more of the propulsion-generating vehicles in the vehicle system 100 that can be used to reduce or eliminate the difference between the actual and designated speeds. The controller unit 822 may direct (e.g., by transmitting instructions) to one or more of the propulsion-generating vehicles to change the respective throttle settings and/or brake settings to reduce or eliminate the difference between the actual and designated speeds. The controller unit 822 may also determine a corresponding change in the throttle settings and/or brake settings of one or more other propulsion-generating vehicles in order to maintain improved handling of the vehicle system 100. For example, if a group bunching effort is being maintained between two or more propulsion-generating vehicles or consists of propulsion-generating vehicles, then a change in the throttle settings of one vehicle or consist to cause the actual speed to match the designated speed may require a change in the throttle settings of another vehicle or consist in order to maintain the group bunching effort. The controller unit 822 can identify this change in the settings of the other vehicle or consist and communicate the change to the other vehicle or consist for implementation.

Although connections between the components in FIG. 8 are not shown, two or more (or all) of the illustrated components may be connected by one or more wired and/or wireless connections, such as cables, busses, wires, wireless networks, and the like.

In one embodiment, a method (e.g., for determining operational settings for a vehicle system having multiple vehicles connected with each other by couplers to travel along a route) includes identifying total power outputs to be provided by propulsion-generating vehicles of the vehicles in the vehicle system. The total power outputs are determined for different locations of the vehicle system along the route. The method also includes calculating handling parameters of the vehicle system at one or more of the different locations along the route. The handling parameters are representative of at least one of forces exerted the couplers, energies stored in the couplers, relative velocities of neighboring vehicles of the vehicles in the vehicle system, or natural forces exerted on one or more segments of the vehicle system between two or more of the propulsion-generating vehicles. The method also includes determining asynchronous operational settings for the propulsion-generating vehicles at the different locations along the route. The asynchronous operational settings represent different operational settings for the propulsion-generating vehicles that cause the propulsion-generating vehicles to provide at least the total power outputs at the respective different locations while changing the handling parameters of the vehicle system to one or more designated values at the different locations along the route. The method further includes communicating the asynchronous operational settings to the propulsion-generating vehicles in order to cause the propulsion-generating vehicles to implement the asynchronous operational settings at the different locations.

In another aspect, the asynchronous operational settings are determined by identifying the different operational settings for the propulsion-generating vehicles that reduce the handling parameters relative to different handling parameters associated with using synchronous operational settings for the propulsion-generating vehicles at the respective different locations to provide the total power outputs at the respective different locations.

In another aspect, the handling parameters include coupler parameters representative of at least one of the forces exerted on the couplers or the energies stored in the couplers.

In another aspect, the handling parameters include terrain excitation parameters representative of at least one of grades of the route at the respective different locations, masses of one or more of the vehicles in the vehicle system at the respective different locations, or tractive efforts provided by one or more of the propulsion-generating vehicles at the respective different locations.

In another aspect, identifying one or more nodes in the vehicle system, the one or more nodes representative of an estimated force exerted on a coupler that has an absolute value that is less than a designated threshold. The handling parameters include node parameters representative of at least one of a number of the nodes in the vehicle system or a rate of movement of the nodes in the vehicle system.

In another aspect, the handling parameters include neighboring velocity parameters representative of the relative velocities of neighboring vehicles of the vehicles in the vehicle system and determined by identifying estimated differences in estimated speed between the neighboring vehicles in the vehicle system.

In another aspect, the method includes modifying the asynchronous operational settings to reduce at least one of an amount of fuel to be consumed by the vehicle system, an amount of emissions to be generated by the vehicle system, or a travel time of the vehicle system for the trip while maintaining a resulting increase in the handling parameters below a designated threshold.

In another aspect, the handling parameters include the natural forces that are representative of one or more tensile or compressive forces exerted on the one or more segments of the vehicle system from a gravitational force.

In another aspect, the total power outputs to be provided by propulsion-generating vehicles are identified from a synchronous trip plan that designates synchronous operational settings for the propulsion-generating vehicles at the locations. When the vehicle system travels along the route according to the synchronous trip plan causes the vehicle system to reduce at least one of fuel consumed, emissions generated, or travel time relative to another, different trip plan that designates one or more other, different synchronous operational settings.

In another aspect, the method also includes at least one of autonomously implementing the asynchronous operational settings at the different locations or communicating the asynchronous operational settings for the vehicle system at one or more of a current location or an upcoming location to an operator of the vehicle system for the operator to manually implement the asynchronous operational settings.

In another aspect, the method also includes modifying the one or more designated values to which the handling parameters are changed based on at least one of a terrain of the route, a mass distribution of the vehicle system, a type of the vehicle system, or a type of the couplers in the vehicle system.

In one embodiment, a system (e.g., a control system for a vehicle system) includes an effort determination unit configured to identify total power outputs to be provided by a vehicle system that includes multiple vehicles connected with each other by couplers to travel along a route. The effort determination unit also is configured to identify the total power outputs to be provided by propulsion-generating vehicles of the vehicles in the vehicle system at different locations of the vehicle system along the route. The system includes a handling unit configured to calculate handling parameters of the vehicle system at one or more of the different locations along the route. The handling parameters are representative of at least one of forces exerted the couplers, energies stored in the couplers, relative velocities of neighboring vehicles of the vehicles in the vehicle system, or natural forces exerted on one or more segments of the vehicle system between two or more of the propulsion-generating vehicles. The system includes a processing unit configured to determine asynchronous operational settings for the propulsion-generating vehicles at the different locations along the route. The asynchronous operational settings represent different operational settings for the propulsion-generating vehicles that cause the propulsion-generating vehicles to provide at least the total power outputs at the respective different locations while changing the handling parameters of the vehicle system to one or more designated values at the different locations along the route. The asynchronous operational settings are configured to be communicated to the propulsion-generating vehicles in order to cause the propulsion-generating vehicles to implement the asynchronous operational settings at the different locations.

In another aspect, the processing unit is configured to identify the different operational settings for the propulsion-generating vehicles that reduce the handling parameters relative to different handling parameters associated with using synchronous operational settings for the propulsion-generating vehicles at the respective different locations to provide the total power outputs at the respective different locations.

In another aspect, the handling parameters include coupler parameters representative of at least one of the forces exerted on the couplers or the energies stored in the couplers.

In another aspect, the handling parameters include terrain excitation parameters based on at least one of grades of the route at the respective different locations, masses of one or more of the vehicles in the vehicle system at the respective different locations, or tractive efforts provided by one or more of the propulsion-generating vehicles at the respective different locations.

In another aspect, the handling unit is configured to identify one or more nodes in the vehicle system. The one or more nodes are representative of an estimated force exerted on a coupler that has an absolute value that is less than a designated threshold. The handling parameters include node parameters representative of at least one of a number of the nodes in the vehicle system or a rate of movement of the nodes in the vehicle system.

In another aspect, the handling parameters include neighboring velocity parameters representative of the relative velocities of neighboring vehicles of the vehicles in the vehicle system and determined by identifying estimated differences in estimated speed between the neighboring vehicles in the vehicle system.

In another aspect, the processing unit is configured to modify the asynchronous operational settings to reduce at least one of an amount of fuel to be consumed by the vehicle system, an amount of emissions to be generated by the vehicle system, or a travel time of the vehicle system for the trip while maintaining a resulting increase in the handling parameters below a designated threshold.

In one embodiment, a method (e.g., for determining operational settings for a vehicle system having two or more propulsion-generating vehicles coupled with each other by one or more non-propulsion generating vehicles) includes obtaining route data and vehicle data. The route data is representative of one or more grades of a route at one or more locations along the route that is to be traveled by the vehicle system. The vehicle data is representative of a size of the one or more non-propulsion generating vehicles disposed between the propulsion-generating vehicles. The method also includes calculating one or more estimated natural forces that are to be exerted on couplers connected with the one or more non-propulsion generating vehicles of the vehicle system at the one or more locations along the route. The one or more estimated natural forces are based on the size of the one or more non-propulsion generating vehicles and the one or more grades of the route at the one or more locations along the route. The method also includes determining asynchronous operational settings to be implemented by the two or more propulsion-generating vehicles at the one or more locations along the route. Implementing the asynchronous operational settings by the two or more propulsion-generating vehicles reduces one or more actual natural forces that are actually exerted on the couplers to forces that are smaller than the one or more estimated natural forces when the vehicle system travels over the one or more locations along the route.

In another aspect, when the one or more estimated natural forces are tensile forces, the asynchronous operational settings instruct the two or more propulsion-generating vehicles to implement at least one of different throttle settings or different brake settings to compress the couplers connected with the non-propulsion generating vehicles.

In another aspect, when the one or more estimated natural forces are compressive forces, the asynchronous operational settings instruct the two or more propulsion-generating vehicles to implement at least one of different throttle settings or different brake settings to stretch the couplers connected with the non-propulsion generating vehicles.

In one embodiment, a method (e.g., for determining operational settings of a vehicle system) includes obtaining route data and vehicle data. The route data is representative of one or more grades of a route at one or more locations along the route that is to be traveled by a vehicle system having two or more propulsion-generating vehicles coupled with each other by one or more non-propulsion generating vehicles. The vehicle data is representative of a size of the one or more non-propulsion generating vehicles disposed between the propulsion-generating vehicles. The method also includes calculating handling parameters of the vehicle system at one or more different locations along the route based on the route data and the vehicle data. The handling parameters are representative of at least one of forces expected to be exerted the couplers, energies expected to be stored in the couplers, expected relative velocities of neighboring vehicles of the vehicles in the vehicle system, or expected natural forces exerted on one or more segments of the vehicle system between two or more of the propulsion-generating vehicles. The method further includes determining asynchronous operational settings to be implemented by the two or more propulsion-generating vehicles at the one or more locations along the route based on the handling parameters. The asynchronous operational settings are determined by identifying a combination of the asynchronous operational settings at the different locations along the route that result in the handling parameters being decreased to one or more designated limits.

It is to be understood that the above description is intended to be illustrative, and not restrictive. For example, the above-described embodiments (and/or aspects thereof) may be used in combination with each other. Use of the term "additionally" (and other similar terms) may refer to the inclusion of another aspect, function, component, or the like, or may refer to an alternative to a previously listed or described aspect, function, component, or the like. Use of the term "alternatively" (and other similar terms) may refer to an alternative to a previously listed or described aspect, function, component, or the like, or to the inclusion of another aspect, function, component, or the like.

Many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

The invention claimed is:

1. A method comprising:
for a vehicle system having multiple vehicles connected with each other by couplers to travel along a route, identifying total power outputs to be provided by propulsion-generating vehicles of the vehicles in the vehicle system, the total power outputs determined for different locations of the vehicle system along the route;
calculating handling parameters of the vehicle system at one or more of the different locations along the route, the handling parameters representative of at least one of forces exerted on the couplers, energies stored in the couplers, relative velocities of neighboring vehicles of the vehicles in the vehicle system, or natural forces exerted on one or more segments of the vehicle system between two or more of the propulsion-generating vehicles;
determining asynchronous operational settings for the propulsion-generating vehicles at the different locations along the route, the asynchronous operational settings representing different operational settings for the propulsion-generating vehicles that cause the propulsion-generating vehicles to provide at least the total power outputs at the respective different locations while changing the handling parameters of the vehicle system to one or more designated values at the different locations along the route; and
communicating the asynchronous operational settings to the propulsion-generating vehicles in order to cause the propulsion-generating vehicles to implement the asynchronous operational settings at the different locations.

2. The method of claim 1, wherein the asynchronous operational settings are determined by identifying the different operational settings for the propulsion-generating vehicles that reduce the handling parameters relative to different handling parameters associated with using synchronous operational settings for the propulsion-generating vehicles at the respective different locations to provide the total power outputs at the respective different locations.

3. The method of claim 1, wherein the handling parameters include coupler parameters representative of at least one of the forces exerted on the couplers or the energies stored in the couplers.

4. The method of claim 1, wherein the handling parameters include terrain excitation parameters representative of at least one of grades of the route at the respective different locations, masses of one or more of the vehicles in the vehicle system at the respective different locations, or tractive efforts provided by one or more of the propulsion-generating vehicles at the respective different locations.

5. The method of claim 1, further comprising identifying one or more nodes in the vehicle system, the one or more nodes representative of an estimated force exerted on a coupler that has an absolute value that is less than a designated threshold, wherein the handling parameters include node parameters representative of at least one of a number of the nodes in the vehicle system or a rate of movement of the nodes in the vehicle system.

6. The method of claim 1, wherein the handling parameters include neighboring velocity parameters representative of the relative velocities of neighboring vehicles of the vehicles in the vehicle system and determined by identifying estimated differences in estimated speed between the neighboring vehicles in the vehicle system.

7. The method of claim 1, further comprising modifying the asynchronous operational settings to reduce at least one of an amount of fuel to be consumed by the vehicle system, an amount of emissions to be generated by the vehicle system, or a travel time of the vehicle system for the trip while maintaining a resulting increase in the handling parameters below a designated threshold.

8. The method of claim 1, wherein the handling parameters include the natural forces that are representative of one or more tensile or compressive forces exerted on the one or more segments of the vehicle system from a gravitational force.

9. The method of claim 1, wherein the total power outputs to be provided by propulsion-generating vehicles are identified from a synchronous trip plan that designates synchronous operational settings for the propulsion-generating vehicles at the locations, wherein the vehicle system traveling along the route according to the synchronous trip plan causes the vehicle system to reduce at least one of fuel consumed, emissions generated, or travel time relative to another, different trip plan that designates one or more other, different synchronous operational settings.

10. The method of claim 1, further comprising at least one of autonomously implementing the asynchronous operational settings at the different locations or communicating the asynchronous operational settings for the vehicle system at one or more of a current location or an upcoming location to an operator of the vehicle system for the operator to manually implement the asynchronous operational settings.

11. The method of claim 1, further comprising modifying the one or more designated values to which the handling parameters are changed based on at least one of a terrain of the route, a mass distribution of the vehicle system, a type of the vehicle system, or a type of the couplers in the vehicle system.

12. A system comprising:
an effort determination unit configured to identify total power outputs to be provided by a vehicle system that includes multiple vehicles connected with each other by couplers to travel along a route, the effort determination unit configured to identify the total power outputs to be provided by propulsion-generating vehicles of the vehicles in the vehicle system at different locations of the vehicle system along the route;
a handling unit configured to calculate handling parameters of the vehicle system at one or more of the different locations along the route, the handling parameters representative of at least one of forces exerted on the couplers, energies stored in the couplers, relative velocities of neighboring vehicles of the vehicles in the vehicle system, or natural forces exerted on one or more segments of the vehicle system between two or more of the propulsion-generating vehicles; and
a processing unit configured to determine asynchronous operational settings for the propulsion-generating vehicles at the different locations along the route, the asynchronous operational settings representing different operational settings for the propulsion-generating vehicles that cause the propulsion-generating vehicles to provide at least the total power outputs at the respective different locations while changing the handling parameters of the vehicle system to one or more designated values at the different locations along the route, wherein the asynchronous operational settings are configured to be communicated to the propulsion-generating vehicles in order to cause the propulsion-generating vehicles to implement the asynchronous operational settings at the different locations.

13. The system of claim 12, wherein the processing unit is configured to identify the different operational settings for the propulsion-generating vehicles that reduce the handling parameters relative to different handling parameters associated with using synchronous operational settings for the propulsion-generating vehicles at the respective different locations to provide the total power outputs at the respective different locations.

14. The system of claim 12, wherein the handling parameters include coupler parameters representative of at least one of the forces exerted on the couplers or the energies stored in the couplers.

15. The system of claim 12, wherein the handling parameters include terrain excitation parameters based on at least one of grades of the route at the respective different locations, masses of one or more of the vehicles in the vehicle system at the respective different locations, or tractive efforts provided by one or more of the propulsion-generating vehicles at the respective different locations.

16. The system of claim 12, wherein the handling unit is configured to identify one or more nodes in the vehicle system, the one or more nodes representative of an estimated force exerted on a coupler that has an absolute value that is less than a designated threshold, and wherein the handling parameters include node parameters representative of at least one of a number of the nodes in the vehicle system or a rate of movement of the nodes in the vehicle system.

17. The system of claim 12, wherein the handling parameters include neighboring velocity parameters representative of the relative velocities of neighboring vehicles of the vehicles in the vehicle system and determined by identifying estimated differences in estimated speed between the neighboring vehicles in the vehicle system.

18. The system of claim 12, wherein the processing unit is configured to modify the asynchronous operational settings to reduce at least one of an amount of fuel to be consumed by the vehicle system, an amount of emissions to be generated by the vehicle system, or a travel time of the vehicle system for the trip while maintaining a resulting increase in the handling parameters below a designated threshold.

19. A method comprising:
obtaining route data and vehicle data, the route data representative of one or more grades of a route at one or more locations along the route that is to be traveled by a vehicle system having two or more propulsion-generating vehicles coupled with each other by one or more non-propulsion generating vehicles, the vehicle data representative of a size of the one or more non-propulsion generating vehicles disposed between the propulsion-generating vehicles;
calculating one or more estimated natural forces that are to be exerted on couplers connected with the one or more non-propulsion generating vehicles of the vehicle system at the one or more locations along the route, the one or more estimated natural forces based on the size of the one or more non-propulsion generating vehicles and the one or more grades of the route at the one or more locations along the route; and
determining asynchronous operational settings to be implemented by the two or more propulsion-generating vehicles at the one or more locations along the route, wherein implementing the asynchronous operational settings by the two or more propulsion-generating vehicles reduces one or more actual natural forces that are actually exerted on the couplers to forces that are smaller than the one or more estimated natural forces when the vehicle system travels over the one or more locations along the route.

20. The method of claim 19, wherein, when the one or more estimated natural forces are tensile forces, the asynchronous operational settings instruct the two or more propulsion-generating vehicles to implement at least one of different throttle settings or different brake settings to compress the couplers connected with the non-propulsion generating vehicles.

21. The method of claim 19, wherein, when the one or more estimated natural forces are compressive forces, the asynchronous operational settings instruct the two or more propulsion-generating vehicles to implement at least one of different throttle settings or different brake settings to stretch the couplers connected with the non-propulsion generating vehicles.

22. A method comprising:
obtaining route data and vehicle data, the route data representative of one or more grades of a route at one or more locations along the route that is to be traveled by a vehicle system having two or more propulsion-generating vehicles coupled with each other by one or more non-propulsion generating vehicles, the vehicle data representative of a size of the one or more non-propulsion generating vehicles disposed between the propulsion-generating vehicles;

calculating handling parameters of the vehicle system at one or more different locations along the route based on the route data and the vehicle data, the handling parameters representative of at least one of forces expected to be exerted the couplers, energies expected to be stored in the couplers, expected relative velocities of neighboring vehicles of the vehicles in the vehicle system, or expected natural forces exerted on one or more segments of the vehicle system between two or more of the propulsion-generating vehicles; and determining asynchronous operational settings to be implemented by the two or more propulsion-generating vehicles at the one or more locations along the route based on the handling parameters, wherein the asynchronous operational settings are determined by identifying a combination of the asynchronous operational settings at the different locations along the route that result in the handling parameters being decreased to one or more designated limits.

\* \* \* \* \*